United States Patent [19]

Gruber et al.

[11] Patent Number: 5,247,059

[45] Date of Patent: * Sep. 21, 1993

[54] CONTINUOUS PROCESS FOR THE MANUFACTURE OF A PURIFIED LACTIDE FROM ESTERS OF LACTIC ACID

[75] Inventors: Patrick R. Gruber, St. Paul; Eric S. Hall, Crystal; Jeffrey J. Kolstad, Wayzata; Matthew L. Iwen, Minneapolis; Richard D. Benson, Long Lake; Ronald L. Borchardt, Eden Prairie, all of Minn.

[73] Assignee: Cargill, Incorporated, Minneapolis, Minn.

[ * ] Notice: The portion of the term of this patent subsequent to Aug. 25, 2009 has been disclaimed.

[21] Appl. No.: 935,566

[22] Filed: Aug. 24, 1992

Related U.S. Application Data

[63] Continuation-in-part of Ser. No. 825,059, Jan. 24, 1992, Pat. No. 5,142,023.

[51] Int. Cl.$^5$ .................. C08G 63/08; C07D 319/12
[52] U.S. Cl. .................................. 528/354; 525/415; 526/68; 528/357; 549/274
[58] Field of Search ............... 528/354, 357; 525/415; 549/274; 526/67, 68

[56] References Cited

U.S. PATENT DOCUMENTS

| | | | |
|---|---|---|---|
| 1,095,205 | 5/1914 | Grüter et al. | 528/361 |
| 1,849,107 | 3/1932 | Moss | 528/354 |
| 1,995,970 | 4/1935 | Dorough | 528/354 |
| 2,396,994 | 3/1946 | Filachione et al. | 528/354 |
| 2,703,316 | 3/1955 | Schneider | 528/354 |
| 2,758,987 | 8/1956 | Salzberg | 528/354 |
| 2,951,828 | 9/1960 | Zeile et al. | 528/354 |
| 3,268,487 | 8/1966 | Klootwijk | 528/354 |
| 3,322,791 | 5/1967 | Selman | 549/274 |
| 3,531,561 | 9/1970 | Trehu | 264/210 |
| 3,636,956 | 1/1972 | Schneider | 606/224 |
| 3,772,420 | 11/1973 | Glick et al. | 264/102 |
| 3,773,919 | 11/1973 | Boswell et al. | 424/19 |

(List continued on next page.)

FOREIGN PATENT DOCUMENTS

| | | |
|---|---|---|
| 808731 | 3/1969 | Canada . |
| 863673 | 2/1971 | Canada . |
| 923245 | 3/1973 | Canada . |
| 0107591 | 2/1984 | European Pat. Off. . |
| 0299730 | 1/1989 | European Pat. Off. . |
| 0314245 | 5/1989 | European Pat. Off. . |
| 0052510 | 3/1992 | European Pat. Off. . |
| 0481732 | 4/1992 | European Pat. Off. . |

(List continued on next page.)

OTHER PUBLICATIONS

T. M. Jackanicz, "Polylactic Acid as a Biodegradable Carrier for Contraceptive Steroids", *Contraception*, vol. 8, No. 3, 227-234 (1973).

A. D. Schwope et al., "Lactic/Glycolic Acid Polymers as Narcotic Antagonist Delivery Systems", *Life Sciences*, vol. 17, 1877-1886 (1975).

L. C. Anderson, "An Injectable Sustained Release Fertility Control System", *Contraception*, vol. 13, No. 3, 375-384 (1976).

D. L. Wise et al., "Sustained Release of an Antimalarial Drug Using a Copolymer of Glycolic/Lactic Acid", *Life Sciences*, vol. 19, 867-874 (1976).

(List continued on next page.)

*Primary Examiner*—John Kight, III
*Assistant Examiner*—Shelley A. Dodson
*Attorney, Agent, or Firm*—Merchant, Gould, Smith, Edell, Welter & Schmidt

[57] ABSTRACT

A process for the continuous production of substantially purified lactide and lactide polymers from an ester of lactic acid including the steps of forming crude lactide in the presence of a catalyst means to form a condensation reaction by-product and polylactic acid and depolymerizing the polylactic acid molecules followed by subsequent purification of the crude lactide in a distillation system. A purified lactide is then polymerized.

58 Claims, 12 Drawing Sheets

U.S. PATENT DOCUMENTS

| | | |
|---|---|---|
| 3,839,297 | 10/1974 | Wassermann et al. ............... 528/357 |
| 3,887,699 | 6/1975 | Yolles ............................... 424/19 |
| 3,912,692 | 10/1975 | Casey et al. ........................ 528/354 |
| 4,045,418 | 8/1977 | Sinclair ............................... 528/357 |
| 4,249,531 | 2/1981 | Heller et al. ........................ 128/260 |
| 4,273,920 | 6/1981 | Nevin ................................ 528/354 |
| 4,279,249 | 7/1981 | Vert et al. ........................... 128/92 |
| 4,595,713 | 6/1986 | St. John ............................. 523/105 |
| 4,643,734 | 2/1987 | Lin ...................................... 623/16 |
| 4,677,191 | 6/1987 | Tanaka et al. ....................... 528/361 |
| 4,683,288 | 7/1987 | Tanaka et al. ....................... 528/361 |
| 4,719,246 | 1/1988 | Murdoch et al. .................... 521/134 |
| 4,727,163 | 2/1988 | Bellis ................................... 549/274 |
| 4,728,721 | 3/1988 | Yamamoto et al. ................. 528/361 |
| 4,766,182 | 8/1988 | Murdoch et al. .................... 525/413 |
| 4,789,726 | 12/1988 | Hutchinson ......................... 528/354 |
| 4,797,468 | 1/1989 | De Vries ............................. 528/354 |
| 4,800,219 | 1/1989 | Murdoch et al. .................... 525/413 |
| 4,835,293 | 5/1989 | Bhatia ................................. 549/274 |
| 4,902,515 | 2/1990 | Loomis et al. ...................... 424/486 |
| 4,950,258 | 8/1990 | Kawai et al. ........................ 604/281 |
| 4,960,866 | 10/1990 | Bendix et al. ....................... 528/499 |
| 4,981,696 | 1/1991 | Loomis et al. ...................... 424/486 |
| 4,983,745 | 1/1991 | Muller et al. ........................ 549/274 |
| 4,990,222 | 2/1991 | Aigner et al. ....................... 203/91 |
| 5,011,946 | 4/1991 | Hess et al. ........................... 549/274 |
| 5,023,349 | 6/1991 | Bhatia ................................. 549/274 |
| 5,023,350 | 6/1991 | Bhatia ................................. 549/274 |
| 5,028,667 | 7/1991 | McLain et al. ...................... 525/415 |
| 5,041,529 | 8/1991 | Shinoda et al. ..................... 528/354 |
| 5,043,458 | 8/1991 | Bhatia ................................. 549/274 |
| 5,053,485 | 10/1991 | Nieuwenhuis et al. ............. 528/354 |
| 5,053,522 | 10/1991 | Muller ................................. 549/274 |
| 5,076,983 | 12/1991 | Loomis et al. ...................... 264/101 |
| 5,097,005 | 3/1992 | Tietz ................................... 528/272 |
| 5,108,399 | 4/1992 | Eitenmuller et al. ................ 606/77 |
| 5,132,397 | 7/1992 | DeGuia ............................... 528/354 |
| 5,134,171 | 7/1992 | Hammel et al. ..................... 521/98 |
| 5,136,017 | 8/1992 | Kharas et al. ....................... 528/354 |
| 5,142,023 | 8/1992 | Gruber et al. ....................... 528/354 |
| 5,149,833 | 9/1992 | Hess et al. ........................... 549/274 |
| 5,180,765 | 1/1992 | Sinclair ............................... 524/306 |

FOREIGN PATENT DOCUMENTS

| | | |
|---|---|---|
| 0507554 | 10/1992 | European Pat. Off. . |
| 0510998 | 10/1992 | European Pat. Off. . |
| 0515203 | 11/1992 | European Pat. Off. . |
| 267826 | 12/1913 | Fed. Rep. of Germany . |
| 1083275 | 12/1960 | Fed. Rep. of Germany . |
| 1543958 | 2/1970 | Fed. Rep. of Germany . |
| 3632103 | 3/1988 | Fed. Rep. of Germany . |
| 4-283227 | 10/1992 | Japan . |
| WO90/01521 | 2/1990 | PCT Int'l Appl. . |
| WO91/02015 | 2/1991 | PCT Int'l Appl. . |
| WO91/06601 | 5/1991 | PCT Int'l Appl. . |
| WO92/00292 | 1/1992 | PCT Int'l Appl. . |
| WO92/00974 | 1/1992 | PCT Int'l Appl. . |
| WO92/04410 | 3/1992 | PCT Int'l Appl. . |
| WO92/04412 | 3/1992 | PCT Int'l Appl. . |
| WO92/04413 | 3/1992 | PCT Int'l Appl. . |
| WO92/05167 | 4/1992 | PCT Int'l Appl. . |
| WO92/05168 | 4/1992 | PCT Int'l Appl. . |
| WO92/05311 | 4/1992 | PCT Int'l Appl. . |
| WO92/15340 | 9/1992 | PCT Int'l Appl. . |
| WO91/17155 | 11/1992 | PCT Int'l Appl. . |
| 1040168 | 8/1966 | United Kingdom . |
| 1108720 | 4/1968 | United Kingdom . |
| 1351409 | 5/1974 | United Kingdom . |
| 2145422 | 3/1985 | United Kingdom . |

OTHER PUBLICATIONS

R. A. Miller et al., "Degradation Rates of Resorbable Implants (Polylactates and Polyglycolates): Rate Modification with Changes in Pla/Pga Copolymer Rations", *J. Biomed. Mater. Res.*, vol. 11, 711–719 (1977).

D. K. Gilding et al., "Biodegradable Polymers for Use in Surgery–Polyglycolic/Polylactic Acid Homo and Copolymers": 1. *Polymer*, vol. 2, 1459–1464 (1979).

D. K. Gilding, "Degradation of Polymers: Mechanisms and Implications for Biomedical Applications", *Biocompatibility of Clinical Implant Materials*, D. F. Williams, ed., vol. 1, 43–65 (1981).

A. M. Reed and D. K. Gilding, "Biodegradable Polymers for Use in Surgery Polyglycolic/Polylactic Acid Homo and Copolymers: 2. In Vitro Degradation", *Polymer*, vol. 22, No. 4, 494–498 (1981).

D. K. Gilding, "Biodegradable Polymers", *Biocompatibility of Clinical Implant Materials*, D. F. Williams, ed., vol. 2, 209–232 (1981).

J. D. Strobel, "Biodegradable Polymers", paper presented at Medical Textiles and Biomedical Polymers and Materials Conference held at Clemson, S.C., U.S.A., Dec. 5–6, 1989, Stolle Research and Development Corp., PD 712–01, pp. 1–32 and Attachments A1–A21.

"Biocompatible Composite Would Be Completely Absorbed in the Body", *Advanced Materials*, vol. 12, No. 15, Aug. 1990, p. 6.

"Polylactides Exhibit Degradability", *Tappi Journal*, Sep. 1991, p. 42.

P. V. Bonsignore et al., 1992, "Poly(lactic acid) Degradable Plastics, Coatings, and Binders", Tappi Pro- (List continued on next page.)

OTHER PUBLICATIONS ceedings (Nonwovens Conference); pp. 129-140.

W. Carothers, G. Dorough, and F. Van Natta ("Studies of Polymerization and Ring Formation. X. The Reversible Polymerization of Six-Membered Cyclic Esters", 1932, *American Chemical Society Journal*, v. 54, pp. 761-772).

E. Filachione, E. Costello, T. Dietz and C. Fisher ("Lactic Acid Derivatives as Plasticizers Esters of Polymeric Lactic Acid", 1951, *Bur. Agric. Ind. Chem.*, v. 11, pp. 1-11).

D. Deane and E. Hammond ("Coagulation of Milk for Cheese-Making by Ester Hydrolysis", 1960, *Journal of Dairy Science*, v. 43, pp. 1421-1429).

Kulkarni et al. ("Biodegradable Poly(lactic acid) Polymers", 1971, *J. Biomed. Mater. Res.*, v. 5, pp. 169-181).

A. Schindler, R. Jeffcoat, G. Kimmel, C. Pitt, M. Wall and R. Zweidinnger ("Biodegradable Polymers for Sustained Drug Delivery", 1977, *Contemporary Topics in Polymer Science*, v. 2, pp. 251-287).

I. Luderwald ("Thermal Degradation of Polyesters in the Mass Spectrometer", 1979, *Dev. Polymer Degradation*, v. 2, pp. 77-98).

M. Vert and F. Chabot ("Stereoregular Bioresorbable Polyesters for Orthopaedic Surgery", 1981, *Makromol. Chem.*, Supp. 5, pp. 30-41).

M. Gupta and V. Deshmukh ("Thermal Oxidative Degradation of Poly-lactic Acid; Part I: Activation Energy of Thermal Degradation in Air", 1982, *Colloid & Polymer Science*, v. 260, pp. 308-311).

M. Gupta and V. Deshmukh ("Thermal Oxidative Degradation of Poly-lactic Acid; Part II: Molecular Weight and Electronic Spectra During Isothermal Heating", 1982, *Colloid & Polymer Science*, v. 260, pp. 514-517).

G. Van Hummel and S. Harkema ("Structure of 3,6-Dimethyl-1,4-Dioxane-2,5-Dione [D-,D-{L-,-L-}Lactide]", 1982, *Acta. Crystallogr.*, v. B38, pp. 1679-1681).

F. Chabot, M. Vert, S. Chapelle and P. Granger ("Configurational Structures of Lactic Acid Stereocopolymers as Determined by $^{13}C(^1H)$ N.M.R.", 1983, *Polymer*, v. 24, pp. 53-59).

F. Kohn, J. Van Don Berg, G. Van De Ridder and J. Feijen ("The Ring-Opening Polymerization of D,L-Lactide in the Melt Initiated with Tetraphenyltin", 1984, *Journal of Applied Polymer Science*, v. 29, pp. 4265-4277).

H. Kricheldorf and A. Serra ("Polylactones 6. Influence of Various Metal Salts on the Optical Purity of Poly(L-lactide)", 1985, *Polymer Bulletin*, v. 14, pp. 497-502).

A. Chawla and T. Chang ("In-Vivo Degradation of Poly(lactic acid) of Different Molecular Weights", 1985, *Biomat., Med. Dev., Art. Org.*, v. 13, pp. 153-162).

I. McNeill and H. Leiper ("Degradation Studies of Some Polyesters and Polycarbonates—1. Polylactide: General Features of the Degradation Under Programmed Heating Conditions", 1985, *Polymer Degradation and Stability*, v. 11, pp. 267-285).

I. McNeill and H. Leiper ("Degradation Studies of Some Polyesters and Polycarbonates—2. Polylactide: Degradation Under Isothermal Conditions, Thermal Degradation Mechanism and Photolysis of the Polymer", 1985, Polymer Degradation and Stability, v. 11, pp. 309-326).

Makino et al. ("Preparation and in Vitro Degradation Properties of Polylactide Microcapsules", 1985, *Chem. Pharm. Bull.*, v. 33, pp. 1195-1201).

D. Garozzo, M. Giuffrida and G. Montaudo ("Primary Thermal Decomposition Processes in Aliphatic Polyesters Investigated by Chemical Ionization Mass Spectrometry", 1986, *Macromolecules*, v. 19, pp. 1643-1649).

"Irganox ® 1076 Antioxidant and Thermal Stabilizer", (published on an unknown date in 1986 by Ciba-Geigy Corporation, Three Skyline Drive, Hawthorne, N.Y. 10532).

J. Leenslag and A. Pennings ("Synthesis of high--molecular-weight poly(L-lactide) initiated with tin 2-ethylhexanoate", 1987, *Makromol. Chem.*, v. 188, pp. 1809-1814).

Nakamura et al. ("Surgical Application of Biodegradable Films Prepared from Lactide-ε-Caprolactone Copolymers", 1987, *Bio. Materials and Clinical Applications*, v. 7, pp. 759-764).

H. Kricheldorf, M. Berl and N. Scharnagl ("Polymerization Mechanism of Metal Alkoxide Initiated Polymerizations of Lactide and Various Lactones", 1988, *Makromol.*, v. 21, pp. 286-293).

K. Jamshidi, S. Hyon and Y. Ikada ("Thermal Characterization of Polylactides", 1988, *Polymer*, v. 29, pp. 2229-2234).

M. Vert ("Bioresorbable Polymers for Temporary (List continued on next page.)

OTHER PUBLICATIONS

Therapeutic Applications", 1989, *Die Angwandte Makromolekulare Chemie*, v. 116-167, pp. 155-168).

"Hydrolytic Stability/Corrosivity of Phosphite Costabilizers", (Technical Bulletin 89-04, published on an unknown date in 1989, by Stars Laboratory, Additives Division, Ciba-Geigy Corporation, Ardsley, N.Y. 10502).

"GE Specialty Chemicals Product Guide CA-4001E", (published on an unknown date in 1989, by General Electric Company, 5th and Avery Street, Parkersburg, W. Va. 26102).

"Tinuvin ® 123 Hindered Aminoether Light Stabilizer for Coatings", (published on an unknown date in 1989, by Ciba-Geigy Corporation, Three Skyline Drive, Hawthorne, N.Y. 10532).

"Irganox ® B-Blends Antioxidants and Process Stabilizers for Polymers", (published on an unknown date in Mar. 1990, by Ciba-Geigy Corporation, Three Skyline Drive, Hawthorne, N.Y. 10532).

"Naugard ® 445, Specialty Chemicals", (a product brochure published on or before May 1, 1990, by Uniroyal Chemical Company, Inc., Middlebury, Conn. 06749).

"Ethanox ® 398 Antioxidant, The First Fluorophosphonite Antioxidant", (published on or before an unknown date in Oct. 1990, by Ethyl Corporation, 451 Florida Blvd., Baton Rouge, La. 70801).

"The Resomer ® Resorbable Polyesters" (published on or before an unknown date in Feb. 1991 by Boehringer Ingelheim KG, D-6507 Ingelheim, W. Germany).

P. Klemchuk, ("Introduction to Polymer Degradation", lecture notes distributed at a seminer entitled: *Principles of Polymer Degradation and Stabilization* in Orlando, Fla., Oct. 28-30, 1991, sponsored by The Institute of Materials Science, State University of New York at New Paltz).

R. Thomas, ("Degradation and Stabilization of Engineering Polymers", lecture notes distributed at a seminar entitled: *Principles of Polymer Degradation and Stabilization* in Orlando, Fla., Oct. 28-30, 1991, sponsored by The Institute of Materials Science, State University of New York at New Paltz).

W. Enlow, ("Process Stabilization with Phosphite Antioxidants", lecture notes distributed at a seminar entitled: *Principles of Polymer Degradation and Stabilization* in Orlando, Fla., Oct. 28-30, 1991, sponsored by The Institute of Materials Science, State University of New York at New Paltz).

"Naugard ® XL-1 Specialty Chemicals", (product brochure published on an unknown date in Feb., 1992, by Uniroyal Chemical Co., Inc., Middlebury, Conn. 06749).

Sir John Meurig Thomas, ("Solid Acid Catalysts", Apr. 1992, *Scientific American*, pp. 112-118).

"Argus Product Data, Argus ® Dimyristyl Thiodipropionate", (published on or before an unknown date in Aug., 1992, by Argus Division, Witco Corporation, 633 Court Street, Brooklyn, N.Y. 11231-2193).

"Argus Thiochemical Product Data, Argus ® Thiodipropionate", (published on or before an unknown date in Aug., 1992, by Argus Division, Witco Corporation, 633 Court Street, Brooklyn, N.Y. 11231-2193).

"Argus Product Data, Argus ® Distearyl Thiodipropionate", (published on or before an unknown date in Aug., 1992, by Argus Division, Witco Corporation, 633 Court Street, Brooklyn, N.Y. 11231-2193).

"Argus Product Data, Mark ® 2140 Pentaerythrityl Octylthiopropionate", (published on or before an unknown date in Aug., 1992, by Argus Division, Witco Corporation, 633 Court Street, Brooklyn, N.Y. 11231-2193).

"Argus Thiochemical Product Data, Argus ® Dilauryl Thiodipropionate", (published on or before an unknown date in Aug., 1992, by Argus Division, Witco Corporation, 633 Court Street, Brooklyn, N.Y. 11231-2193).

"Argus Product Data, Seenox ® 412S Pentaerythritol Tetrakas (B-Laurylthiopropionate)", (published on or before an unknown date in Aug., 1992, by Argus Division, Witco Corporation, 633 Court Street, Brooklyn, N.Y. 11231-2193).

"Irganox ® 1010", (a product brochure published on or before an unknown date in Aug., 1992, by Ciba-Geigy Corporation, Three Skyline Drive, Hawthorne, N.Y. 10532).

"Irganox ® MD 1024, Metal Deactivator/Antioxidant", (published on an unkown date prior to Aug., 1992, by Ciba-Geigy Corporation, Three Skyline Drive, Hawthorne, N.Y. 10532).

"Tinuvin ® 622LD Low Dust, Hindered Amine Light Stabilizer for Polymers FDA-Cleared for Polyolefins", (published on an unknown date before Aug., 1992, by Ciba-Geigy Corporation, Three Skyline Drive, Hawthorne, N.Y. 10532).

CONTINUOUS PROCESS FOR THE MANUFACTURE OF A PURIFIED LACTIDE FROM ESTERS OF LACTIC ACID

This application is a continuation-in-part of U.S. application Ser. No. 07/825,059 which was filed on Jan. 24, 1992 and issued on Aug. 25, 1992 as U.S. Pat. No. 5,142,023.

BACKGROUND OF THE INVENTION

1. Field of the Invention

The present invention relates to processes for the continuous production of lactide and lactide polymers from crude lactic acid and esters of lactic acid in the field of biodegradable polymers.

2. Description of the Prior Art

The continued depletion of landfill space and the problems associated with incineration of waste have led to the need for development of truly biodegradable polymers to be utilized as substitutes for non-biodegradable or partially biodegradable, petrochemical-based polymers. The use of lactic acid and lactide to manufacture a biodegradable polymer is well known in the medical industry. As disclosed by Nieuwenhuis et al. (U.S. Pat. No. 5,053,485), such polymers have been used for making biodegradable sutures, clamps, bone plates and biologically active controlled release devices. It will be appreciated that processes developed for the manufacture of polymers to be utilized in the medical industry have incorporated techniques which respond to the need for high purity and biocompatibility in the final polymer product. Furthermore, the processes were designed to produce small volumes of high dollar-value products, with less emphasis on manufacturing cost and yield. It is believed that prior to Applicants' development, viable, cost-competitive processes for the continuous manufacture of purified lactide and lactide polymers from lactic acid having physical properties suitable for replacing present petrochemical-based polymers in packaging, paper coating and other non-medical industry applications were unknown.

It is known that lactic acid undergoes a condensation reaction to form polylactic acid when water is removed by evaporation or other means The overall polymerization reaction is represented by:

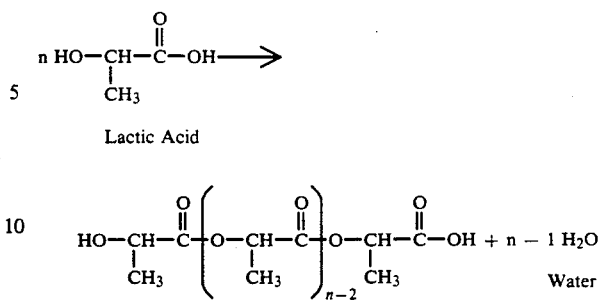

While step n of said polymerization reaction is represented by:

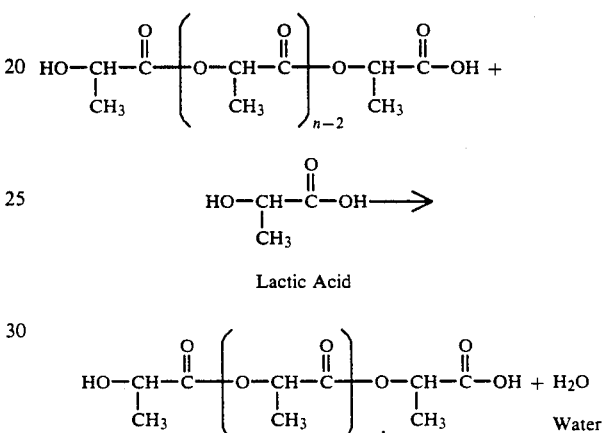

As Dorough (U.S. Pat. No. 1,995,970) recognized and disclosed, the resulting polylactic acid is limited to a low molecular weight polymer of limited value, based on physical properties, due to a competing depolymerization reaction in which the cyclic dimer of lactic acid, lactide, is generated. As the polylactic acid chain lengthens, the polymerization reaction rate decelerates until it reaches the rate of the depolymerization reaction, which effectively, limits the molecular weight of the resulting polymers. An example of this equilibrium reaction is represented below.

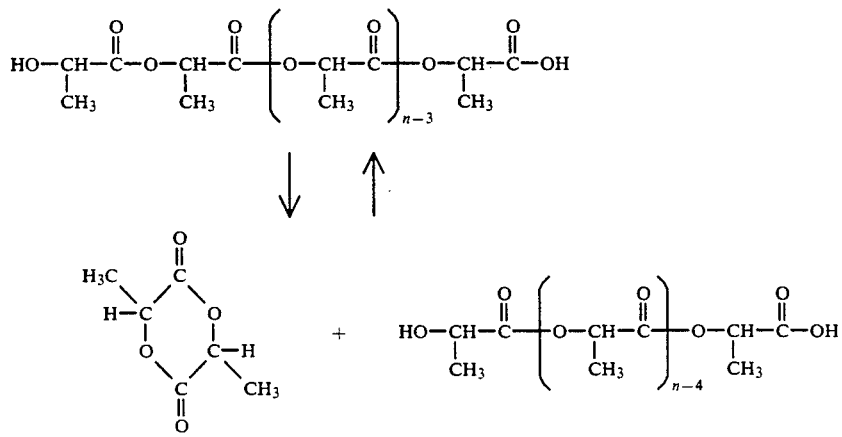

Given this understanding, Dorough was convinced that high molecular weight polymers could not be generated directly from lactic acid. He was, however, successful in generating high molecular weight polymers from lactide, through the lactic acid dimer generated from the low molecular weight polymers of lactic acid. Because these polymers are generated from lactide, they are known as polylactides.

It is well known that lactic acid exists in two forms which are optical enantiomers, designated as D-lactic acid and L-lactic acid. Either D-lactic acid, L-lactic acid or mixtures thereof may be polymerized to form an intermediate molecular weight polylactic acid which, upon further polymerization, generates lactide as earlier disclosed. The lactide, or the cyclic dimer of lactic acid, may have one of three types of optical activity depending on whether it consists of two L-lactic acid molecules, two D-lactic acid molecules or an L-lactic acid molecule and a D-lactic acid molecule combined to form the dimer. These three dimers are designated L-lactide, D-lactide and meso-lactide, respectively. In addition, a 50/50 mixture of L-lactide and D-lactide with a melting point of about 126° C. is often referred to in the literature as D,L-lactide.

DeVries (U.S. Pat. No. 4,797,468) recently disclosed a process for the manufacture of lactide polymers utilizing a solvent extraction process to purify lactide prior to polymerization. With DeVries' disclosure, the inventor recognized that existing literature recommends purification of lactide by several recrystallization steps. It is believed that processes prior to DeVries solvent extraction method, have generally utilized a recrystallization step to purify the crude lactide in order to obtain a source of lactide suitable for polymerization. However, processes utilizing such recrystallization steps are known to have relatively poor yields due to significant losses of lactide during the recrystallization steps. It is believed that producers of medical-related biodegradable products have not been concerned with such low yields because of the high margin generally expected for sales of such products and the lack of competitive alternatives. It will be appreciated, however, that in developing a process for the large-scale, commercial manufacture of biodegradable polymers, such as polylactides, for use in nonmedical-products-oriented applications where such polymers will necessarily compete with low-cost polymers made from petrochemicals, it will be important to maximize yield and minimize other overall cost factors to produce a biodegradable polymer which is cost-competitive.

The biogradable polylactide polymers must also possess physical properties suitable for application in nonmedical products presently utilizing petrochemical-based polymers such as packaging materials, paper coatings and any other disposable articles. Nieuwenhuis et al. disclose that lactide polymers derived from polymerization of mixtures of the three lactides result in polymers with a variety of useful physical properties, including improved biodegradability. However, no commercially viable process for the large-scale manufacture of such lactide polymers is believed to have been disclosed to date.

Lactic acid is commercially available and manufactured from several known processes. Representative examples of such processes are disclosed by Glassner et al. (European Patent Application, EP 393818, Oct. 24, 1990), G. Machell, "Production and Applications of Lactic Acid", *Industrial Chemist and Chemical Manufacturer*, v. 35, pp. 283-90 (1959) and Kirk Othmer, *Encyclopedia of Chemical Technology*, "Lactic Acid", v. 12, pp. 177-78 (2nd ed. 1963).

The optical activity of either lactic acid or lactide is known to alter under certain conditions, with a tendency toward equilibrium at optical inactivity, where equal amounts of the D and L enantiomers are present. Relative concentrations of D and L in the starting materials, the presence of impurities or catalysts and time at varying temperatures and pressures are known to affect the rate of such racemization.

Muller (U.S. Pat. No. 5,053,522) discloses that the preparation of optically pure lactide from an optically pure lactic acid feed is possible when utilizing appropriate conditions and catalysts. However, there is no teaching of a process which controls the optical purity of the resulting lactide to desired degrees or minimizes overall costs and maximizes yield of the lactide product. Furthermore, there is no disclosure of a commercially-viable lactide purification system, which allows production of polymer grade lactide, from crude lactic acid, which may subsequently be polymerized to produce a variety of non-medical-related polylactide polymers suitable for replacing existing petrochemical-based polymers.

Bellis (U.S. Pat. No. 4,727,163) discloses the use of an ester of an alpha-hydroxy acid on a thermally-stable polyether core to manufacture highly pure cyclic esters such as lactide. Bhatia (U.S. Pat. No. 4,835,293) discloses a process for preparing highly pure cyclic esters such as lactide by heating a polymer of the corresponding alpha-hydroxy acid or its ester or a copolymer of the alpha-hydroxy acid or its ester and a thermally-stable polyether core in the presence of an inert gas with the cyclic ester being carried from this reaction with the inert gas to a solvent system. Bellis et al. (PCT Application No. WO 92/00292, published Jan. 9, 1992) disclose a continuous catalyzed vapor phase process for the production of dimeric cyclic esters such as lactide by converting the corresponding alpha-hydroxy carboxylic acid or ester in the vapor phase over a solid catalyst such as silica alumina and preferably silica alumina having a high silica content, in the presence of a carrier gas. However, it is believed that none of these references disclose a commercially viable overall process for the large scale manufacture of polylactide polymers. Furthermore, there is no disclosure of a lactide purification system which allows production of a polymer grade lactide for use in non-medical-related polylactide polymers cost-effectively suitable for replacing existing petrochemical-based polymers.

Accordingly, a need exists for a continuous manufacturing process which utilizes commercially-available crude lactic acid or ester of lactic acid to produce polylactide polymers suitable as a cost-competitive replacement for petrochemical-based polymers. The present invention addresses this need as well as other problems associated with the production of lactide polymers. The present invention also offers further advantages over the prior art, and solves other problems associated therewith.

SUMMARY OF THE INVENTION

The present invention provides a continuous process for the production of lactide polymers from a crude lactic acid feed source. The crude lactic acid feed may be any available combination of the optical enantiomers D-lactic acid and L-lactic acid in solution with a hydroxylic medium such as water or other solvent such as methanol, ethanol, propanol, butanol, isopropanol, isobutanol, or the like, or mixtures thereof. The crude lactic acid or source of lactic acid could also be an ester of lactic acid, such as methyl lactate, ethyl lactate, propyl lactate, butyl lactate, isopropyl lactate, isobutyl lactate or the like, or mixtures thereof. The crude lactic acid may also be a mixture of lactic acid and esters of lactic acid. An ester of lactic acid suitable for use in the present invention may generally be defined by the formula:

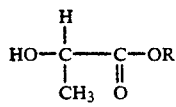

wherein R is a $C_1$-$C_8$ linear or branched alkyl.

When an ester of lactic acid is used as the source of a crude lactic acid for the process of the present invention, the polymerization reaction along with the depolymerization reaction and the equilibrium between the two compounds are altered. The ester group, or more particularly the linear or branched alkoxy group leaves

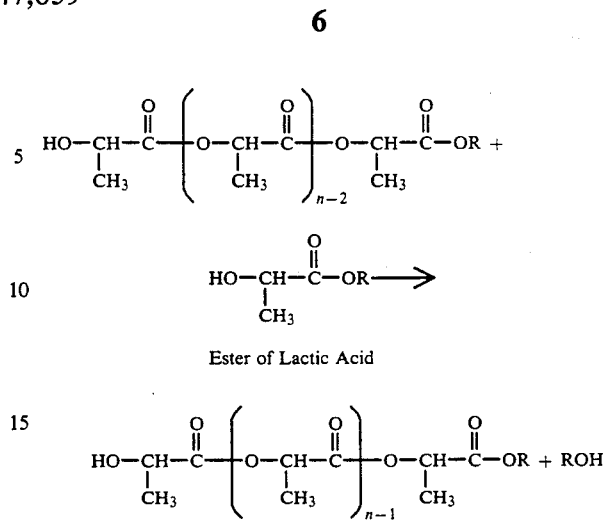

Ester of Lactic Acid

As the polylactic acid chain lengthens, the polymerization reaction rate decelerates and the depolymerization reaction to form lactide accelerates until equilibrium is reached. This equilibrium is represented by:

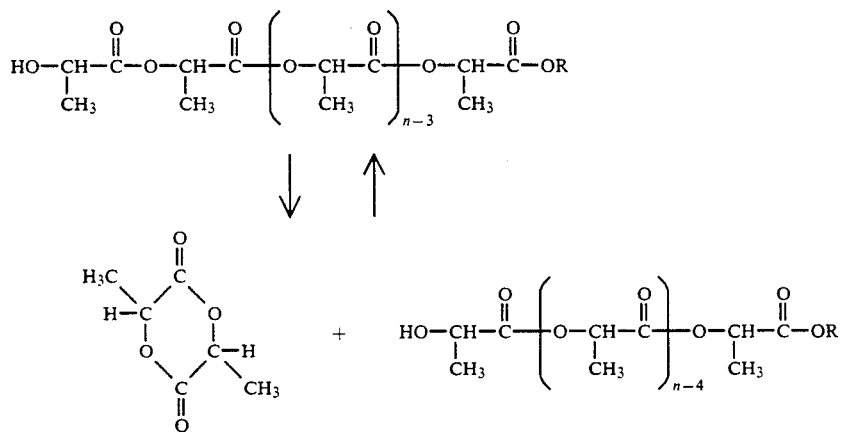

during the polymerization reaction from one end of the lactate molecule while a hydrogen is cleaved from the hydroxy group on the opposite end of another lactate molecule. Thus, a condensation reaction by-product of the formula ROH is formed. The overall polymerization reaction is represented by:

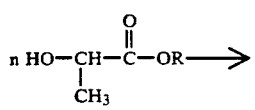

Ester of Lactic Acid

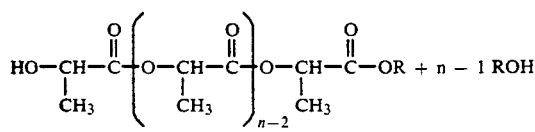

While step n of said polymerization reaction is represented by:

As indicated by the above reactions, polymer chains may contain an ester end group wherein said polymer would be defined as a polylactic ester polymer. For the sake of clarity, applicants herein define polylactic acid or polylactic acid molecules to include the polymer chains disclosed above with an ester end group or end cap as formed from the polymerization of an ester of lactic acid. Further, condensation reaction by-products include both water and chemical compounds of the general formula ROH wherein R is a $C_1$-$C_8$ linear or branched alkyl.

It is, however, recognized that the composition of the crude lactic acid feed source and the design and operating conditions of the process disclosed herein will affect the optical purity of the final polylactide polymer product. The process disclosed herein provides for the control of racemization to advantageously produce a polymer grade lactide of selected optical purity and composition. Because racemization can be controlled, it is possible to project the optical purity and composition of the resulting product based on that of the starting material and on processing conditions. When polymerized, the resulting polylactide can have desirable physical properties for a wide variety of non-medical related applications. Furthermore, impurities such as color bodies, carbohydrates, proteins, amino acids, salts, metal ions, aldehydes, ketones, carboxylic acids, esters of carboxylic acids, esters of carboxylic acids or other organic acids, may be present in the crude lactic acid feed. Applicant's process disclosed herein overcomes problems associated with producing a polymer grade lactide when such contaminants are present.

Referring now briefly to FIG. 1, which provides a preferred flowchart of the overall process disclosed herein, the crude lactic acid is first fed to an evaporator, continuously. Within the evaporator a portion of the water or solvent or any condensation reaction by-product is removed from the crude lactic acid. The water or solvent or any condensation reaction by-product is removed as a vapor from the evaporator and discarded or recycled. The evaporator thus concentrates the lactic acid in the crude feed. It is believed there will be some condensation reaction occurring and the lactic acid may start to form oligomers and low molecular weight polymers during the evaporation step, producing a condensation reaction by-product. A small quantity of lactide may also form. This concentrated lactic acid is next fed to a prepolymer reactor, which in reality is a further evaporator.

It is well known in the art that as water or solvent are removed from a solution of lactic acid, the remaining lactic acid will begin to polymerize. In the prepolymer reactor, sufficient water or solvent and condensation byproducts such as water, ethanol, methanol, propanol, butanol, isopropanol, isobutanol and the like are removed to cause the lactic acid to polymerize to form lactic acid polymers having an average molecular weight of about 100 to about 5000, preferably about 200 to about 3000, and more preferably about 400 to about 2500. The water or solvent removed is recycled or discarded. In preferred embodiments, the water or solvent is recycled back to the evaporation process, because it may be contaminated with lactic acid. In this preferred embodiment, loss of feed material is prevented and the overall yield is increased.

It is recognized by Applicants that the evaporation and prepolymerization stages may be combined into one step. However, Applicants have discovered the benefit of utilizing two steps that allow first removing uncontaminated water or solvent in the evaporation step which is readily discarded or reused without treatment. The vapor stream from the prepolymerization reactor is greatly reduced in volume, yet contains some lactic acid. Recycling back through the initial evaporation step allows recovery of any lactic acid carryover, thus preventing loss of any valuable feed material.

The prepolymer product from the prepolymer reactor, polylactic acid or PLA, is fed to a lactide reactor. A catalyst is simultaneously and continuously fed to the lactide reactor. Many suitable catalysts are known, such as metal oxides, metal halides, metal dusts and organic metal compounds derived from carboxylic acids or the like. It is believed, any such catalyst may be utilized in the process disclosed herein. Polymer properties will, however, vary. In a preferred embodiment, the prepolymer and catalyst are mixed together in a static mixer to facilitate an even distribution of catalyst within the prepolymer. The solution within the lactide reactor would quickly come to an equilibrium distribution of lactide and polylactic acid with the temperature and catalyst employed. Heat is added to vaporize the crude lactide which is continuously removed from the lactide reactor, thus driving the depolymerization reaction, resulting in the net production of lactide as the contents of the lactide reactor seek equilibrium. It is believed that concentrations of unreactive high-boiling polylactic acid and other non-volatile impurities will concentrate in the solution within the lactide reactor. It is believed this will require a purge stream to remove such impurities.

In a preferred embodiment of the present invention, a portion of the purge stream of unreactive high-boiling polylactic acid or other non-volatile impurities in the solution within the lactide reactor may be recycled to a point prior to the lactide reactor system or fed to polymerization. Based on experimental data which will follow hereinbelow, it is believed that any long chain lactic acid polymers will undergo transesterification to form lower molecular weight polylactic acids which may be utilized as a feed source to the lactide reactor. This allows further maximization of yield due to reduced loss of valuable feed material.

The crude lactide vapor is composed of a mixture of all three possible lactides: L-lactide, D-lactide, and meso-lactide, in various combinations. Along with the lactide, there is residual water, lactic acid and condensation reaction byproducts. This crude lactide may be fed directly to a distillation system as a vapor for purification. In a preferred embodiment, this stream is fed to a partial condenser in which the lactide condenses and the majority of the water and other impurities remain as vapors and are recycled back to the lactide reactor or other upstream process equipment such as the evaporator or prepolymer reactor. Preferably, the condensed crude lactide is fed directly to a distillation system for purification. Within this distillation system residual water and lactic acid are preferably removed as a distillate product and recycled back to the lactide reactor or other upstream process equipment such as the evaporator or prepolymer reactor. In addition, provision may be made to remove low molecular weight oligomers which may be present in the crude lactide or formed during distillation. The purified lactide is preferably fed to a polymerization reactor of conventional design.

The distillation system of the present invention may be any conventional distillation column. However, in a preferred embodiment of the present invention the distillation column is utilized to separate the crude lactide into at least three component streams. The overhead low-boiling stream or distillate stream contains those components which have a lower boiling point than lactide, such as lactic acid, water or other solvent and condensation reaction by-products which may be present within the system. The second stream is a high-boiling bottoms stream which contains those components which are higher boiling than a lactide, such as oligomers of lactic acid having at least two lactic acid units in the polymer chain. Both of these streams may contain lactide in various concentrations depending upon equipment design and operation. The third component stream would be the substantially purified lactide which would be removed from the column as an intermediate-boiling sidedraw stream. Substantially purified lactide is any lactide suitable for polymerization to form useful polylactide for application in non-medical related products. Substantially purified lactide is a mixture of lactide and other constituents with a concentration of lactide of about 75% by weight lactide, more preferably about 85% to 95% by weight lactide and most preferably about 99% by weight or greater lactide. Applicants recognize that the intermediate boiling sidedraw stream as removed from the distillation column may not be pure enough to be substantially purified lactide, thus in an alternative embodiment, the intermediate-boiling sidedraw stream upon concentration in the distillation system may be fed to a second distillation system within which the lactide is concentrated to form a substantially purified lactide.

The overhead low-boiling stream may also contain the linear dimer of lactic acid and the linear dimer of lactate esters collectively referred to herein as DP2, or alternatively, such stream may be extracted from the distillation column as a second intermediate-boiling sidedraw stream at a point in the distillation column wherein said DP2 concentration is maximum at steady state. It is recognized that DP2 has a higher boiling point than lactide and should be concentrated in the high boiling bottoms stream, however, applicants recognized DP2 may be formed by ring-opening decomposition of lactide during distillation.

An alternative to a standard distillation column could be incorporated in a preferred embodiment which would include a reactor vessel with a distillation column mounted directly on top of such vessel to create a single enclosed area within which reactions and distillation to purify the lactide take place. In such system catalyst and prepolymer are fed directly to the reactor wherein crude lactide is generated. The crude lactide is vaporized as it is generated and flows directly up into the distillation column mounted on top of the lactide reactor. Within such column the lactide is purified. As indicated above, the top-mounted distillation column would be utilized in the same manner as a conventional distillation system, however, the physical structure of said column varies. Thus, an overhead low-boiling distillate stream, and an intermediate-boiling sidedraw stream are formed. The high-boiling bottoms stream, however, flows down the distillation column back to the lactide reactor for subsequent depolymerization to form more lactide. In a conventional system, the same effect may be accomplished by recycling the high-boiling bottoms stream from the conventional distillation system to the lactide reactor.

As indicated above, the crude lactic acid feed to the process disclosed herein may include a source such as lactic acid, but also the crude lactic acid may be the ester of a lactic acid such as methyl lactate or ethyl lactate. The crude lactic acid feed may also be a mixture of an ester of lactic acid and lactic acid. When an ester of lactic acid, alone or in a mixture with lactic acid, is used as the crude lactic acid feed source for the present process, several modifications are made to the above-disclosed process to improve conversion of raw materials and recovery of by-products. The first such modification includes addition of a catalyst or reacting in the presence of a catalyst the ester of lactic acid to form the condensation product or prepolymer, polylactic acid (as defined herein). Applicants have found that catalysts which may be used include soluble homogeneous catalysts or insoluble solid, supported catalysts. The key to selection of such catalyst is necessity of having acid functionality to provide the necessary protons in the case of an acid or a positive charge density in the case of a Lewis acid, to catalyze the condensation of the ester of lactic acid to form a prepolymer polylactic acid. These catalysts are referred to herein as having acid functionality.

Applicants have also discovered that when a catalyst is added to promote the condensation of the ester of lactic acid to form a prepolymer polylactic acid, the same catalyst also promotes depolymerization of the formed polylactic acid to generate crude lactide. The benefits include downsizing of equipment with the need for less surface area and the ability to conduct the condensation reaction to form the prepolymer and the depolymerization reaction to form lactide within the same reactor or reaction vessel.

Applicants have discovered, however, that it is detrimental to have the acid-functional catalyst present within the distillation system of the process disclosed herein. When present, the catalyst promotes the ring opening of the lactide as it is being purified to generate linear dimer and other oligomers of higher degree of polymerization. To overcome such detriment, applicants have disclosed herein two alternative processes for producing and purifying crude lactide when an ester of lactic acid is utilized as the crude lactic acid source and a catalyst with acid functionality is used. When a soluble catalyst is utilized, the crude lactide is first fed to a flash distillation system wherein a portion of the lactide generated is flashed to a vapor and taken as an overhead stream without substantial residence time within the flash distillation system. The soluble catalyst remains with the higher boiling material which includes prepolymer and some of the lactide which was generated, this bottoms stream is recycled back to the lactide reactor. Alternatively, in a preferred embodiment, applicants utilize an insoluble supported catalyst which is contained within a catalyst bed reactor or catalyst bed reactor system. The ester of lactic acid is fed to this catalyst bed reactor system wherein prepolymer and lactide are both generated in the presence of the solid, supported catalyst. Also generated is condensation reaction by-product. The fact that the supported catalyst is insoluble eliminates the ring-opening reaction problems within the distillation system as mentioned above because it is retained in the catalyst bed reactor.

As mentioned above, there are several conventional distillation systems along with special reactor distillation column arrangements such as the top-mounted distillation column which are able to be utilized to purify a crude lactide stream. All of these systems are believed to be equally applicable to production of purified lactide when an ester of lactic acid is utilized as the crude lactic acid feed source. It is recognized that specific details of equipment size and operating conditions will vary.

The preferred overall process disclosed herein allows for the continuous manufacture of lactide polymers from a crude lactic acid with little or no waste of raw material lactic acid feed or ester of lactic acid feed. This is accomplished by maintaining the crude lactide which was generated in the lactide reactor as a liquid or vapor and avoiding the yield loss associated with the recrystallization step traditionally used to purify the lactide. The purified lactide leaving the distillation system is further maintained as a liquid and fed into a polymerization process.

Other monomers may be added to this purified liquid lactide prior to polymerization to achieve production of co-polymers of polylactide. Representative co-polymers are disclosed by P. Dave, N. Ashar, R. Gross, S McCarthy, "Survey of Polymer Blends Containing Poly (3-hydroxybutyrate-co-16% hydroxyvalerate), *Polymer Preparation, American Chemical Society,* v. 31 (1), pp. 442-3 (1990); B. Riedl and R. Prud'homme, "Thermodynamic Study of Poly(vinyl chloride)-

Polyester Blends by Inverse Gas Phase Chromatography", *J. Polymer Science,* Part B, vol. 24(11), pp. 2565-82 (1986); H. Younes and D. Cohn, "Phase Separation in Poly(ethylene glycol)/Poly(lactic acid) Blends, *European Polymer J.,* v. 24(8), pp. 765-73 (1988); Smith et al. (European Patent Application, EP 209371, Jan. 21, 1987); Pines et al. (European Patent Application EP 109197, May 23, 1984); J. Zhu, Y. Shao, W. Sui, S. Zhang, H. Xiao and X. Tao, "Homopolymers and Copolymers of Glycolide and Lactide", C-MRS Int. Symp. Proc. Meeting Date 1990, v. 3, pp. 387-90 (1990); Jarrett et al. (U.S. Pat. No. 4,788,979); and, T. Nakamura et al., "Surgical Application of Biodegradable Films Prepared from Lactide-Epsilon-Caprolactone Copolymers, *Advanced Biomaterials,* 7 (Biomater. Clin. Appl.) pp. 759-64 (1987).

Applicants believe any monomer capable of copolymerizing with lactide may be used with the process disclosed herein.

In particular, this system allows recovery of any meso-lactide which may be present or formed within the disclosed process and which is normally lost in a recrystallization process. Further, the problems associated with handling solid materials are eliminated. These problems are well-documented by D. D. Deane and E. G. Hammond in "Coagulation of Milk for Cheese-Making by Ester Hydrolysis", *J. Dairy Science,* v. 43, pp. 1421-1429 (1960) and Nieuwenhuis et al. (U.S. Pat. No. 5,053,485) which are incorporated herein by reference. The problems of storing such solids for any time period are also disclosed by Deprospero et al. (U.S. Pat. No. 3,597,449) and F. E. Kohn et al. in *J. of Applied Polymer Science,* Vol. 29, 4265-4277 (1984) which are incorporated herein by reference. These problems include contamination by water vapor which would lead to ring-opening side reactions causing the lactide to convert to lactic acid. The presence of lactic acid in the feed to the final polymerization step will result in polymers of limited molecular weight.

It is believed that the prior art does not teach use of distillation to purify crude lactide streams. Applicants believe that one would not turn to utilization of distillation due to the narrow differences between melting point and boiling point of lactide streams, which potentially could cause solid plugging problems within a distillation system. Furthermore, side reactions in which the lactide ring is opened and polymers of lactic acid are formed may occur during distillation. It is believed, the presence of such side reaction products would lead to undesirable molecular weight limitations in the final polymer product. Applicants have discovered that proper design and control of a distillation system coupled with direct feed of a crude lactide vapor stream or a liquid crude lactide stream after partial condensation to remove water and lactic acid vapor allows purification of crude lactide in a conventional distillation system. Previous to this disclosure, applicants believe, any polymer made from non-optically pure lactide relied on blending the various lactide components, each of which had been purified separately using recrystallization of a crude lactide produced by other techniques.

The present system also allows use of crude lactic acid streams which contain impurities. As designed, the present system allows for removal of both low-boiling and high-boiling impurities prior to distillation of the crude lactide stream which is subsequently polymerized. The prior art fails to disclose a process with such advantages. Further, Applicants have found that impurities may prevent catalyst activation. In a preferred embodiment, this problem is overcome by first activating the catalyst by heating a mixture of the catalyst and purified lactic acid or lactide, then feeding such activated catalyst with the crude lactic acid feed. It is believed the prior art contains no such teaching.

The present system further allows use of a crude lactic acid which is comprised of esters of lactic acid. Applicants have designed an overall process which allows processing of commercially-available esters of lactic acid to polymers of lactide which is commercially feasible as a cost-competitive replacement for petroleum-based polymers. Applicants have found it is necessary to utilize a catalyst with acid functionality to promote the condensation of the ester of lactic acid to form a prepolymer. Applicants have also found that such catalysts promote the depolymerization of the prepolymer to form lactide.

The detrimental effects of using a catalyst with acid functionality are also disclosed by applicants along with process modifications to overcome such detriments. The acid- functional catalyst creates instability within the distillation system, in that such catalyst causes the ring-opening reaction of lactide to form linear dimers and other oligomers of higher degree of polymerization while the lactide is being purified in the distillation column of the present system. Applicants have disclosed the use of a flash distillation system with short residence time to separate the lactide from a soluble acid-functional catalyst. In the alternative, applicants have disclosed the use of a solid, insoluble catalyst alone or on a support with said catalyst contained within a catalyst bed reactor system. The insolubility of the catalyst overcomes the stability problems within the distillation system. It is believed the prior art contains no such teachings.

These and various other advantages and features of novelty which characterize the present invention are pointed out with particularity in the claims annexed hereto and forming a part hereof. However, for a better understanding of the invention, its advantages, and the objects attained by its use, reference should be made to the drawings which form a further part hereof, and to the accompanying descriptive matter, in which there are illustrated and described preferred embodiments of the present invention.

BRIEF DESCRIPTION OF THE DRAWINGS

In the drawings, in which like referenced numerals indicate corresponding parts or elements of preferred embodiments of the present invention throughout the several views.

DETAILED DESCRIPTION OF THE PREFERRED EMBODIMENTS

As required, detailed embodiments of the present invention are disclosed herein. However, it is to be understood that the disclosed embodiments are merely exemplary of the present invention which may be embodied in various systems. Therefore, specific details disclosed herein are not to be interpreted as limiting, but rather as a basis for the claims and as a representative basis for teaching one skilled in the art to variously practice the present invention.

Figure 1:
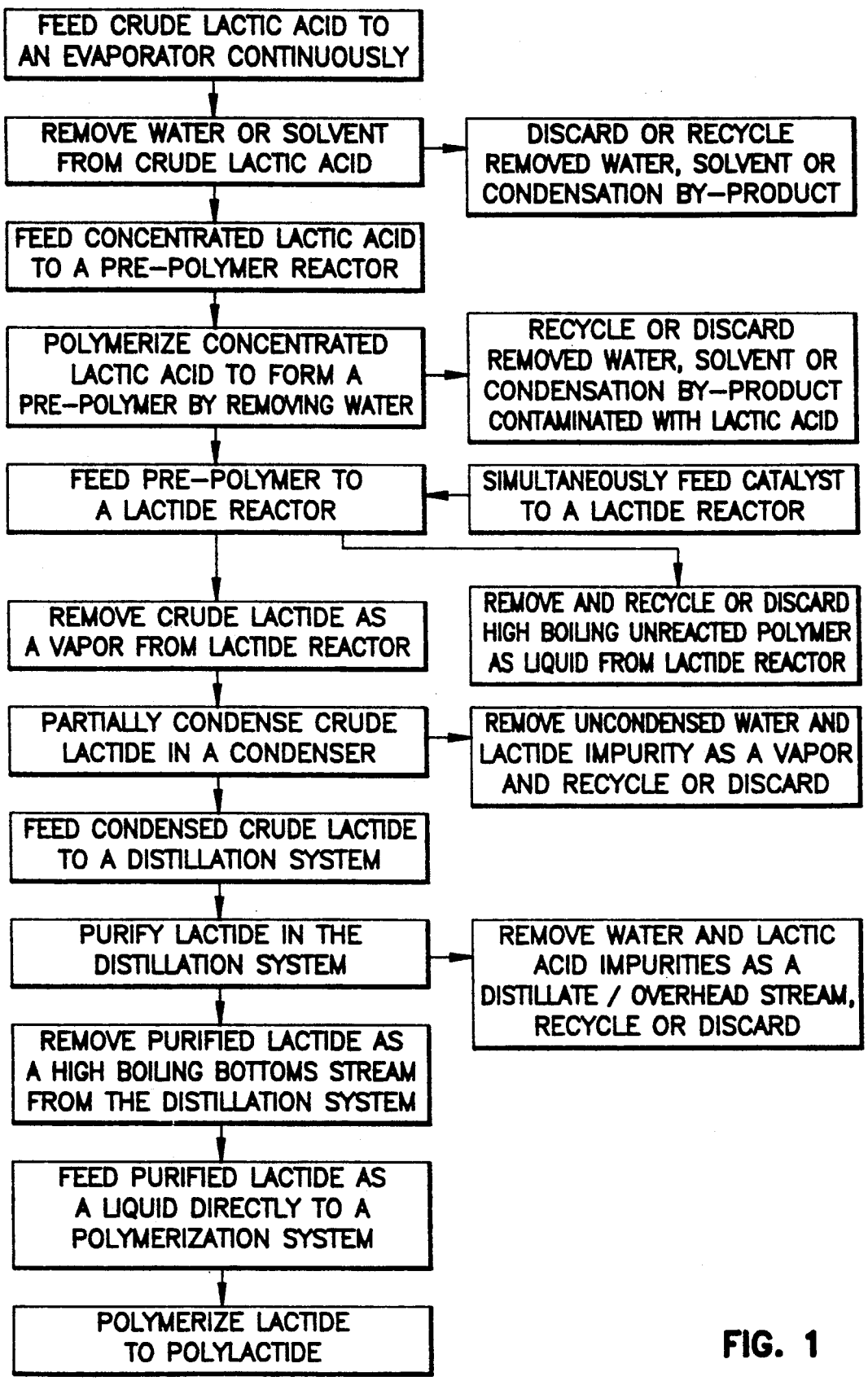
FIG. 1 is a flow diagram of the preferred overall process steps of the present invention.
Figure 2:
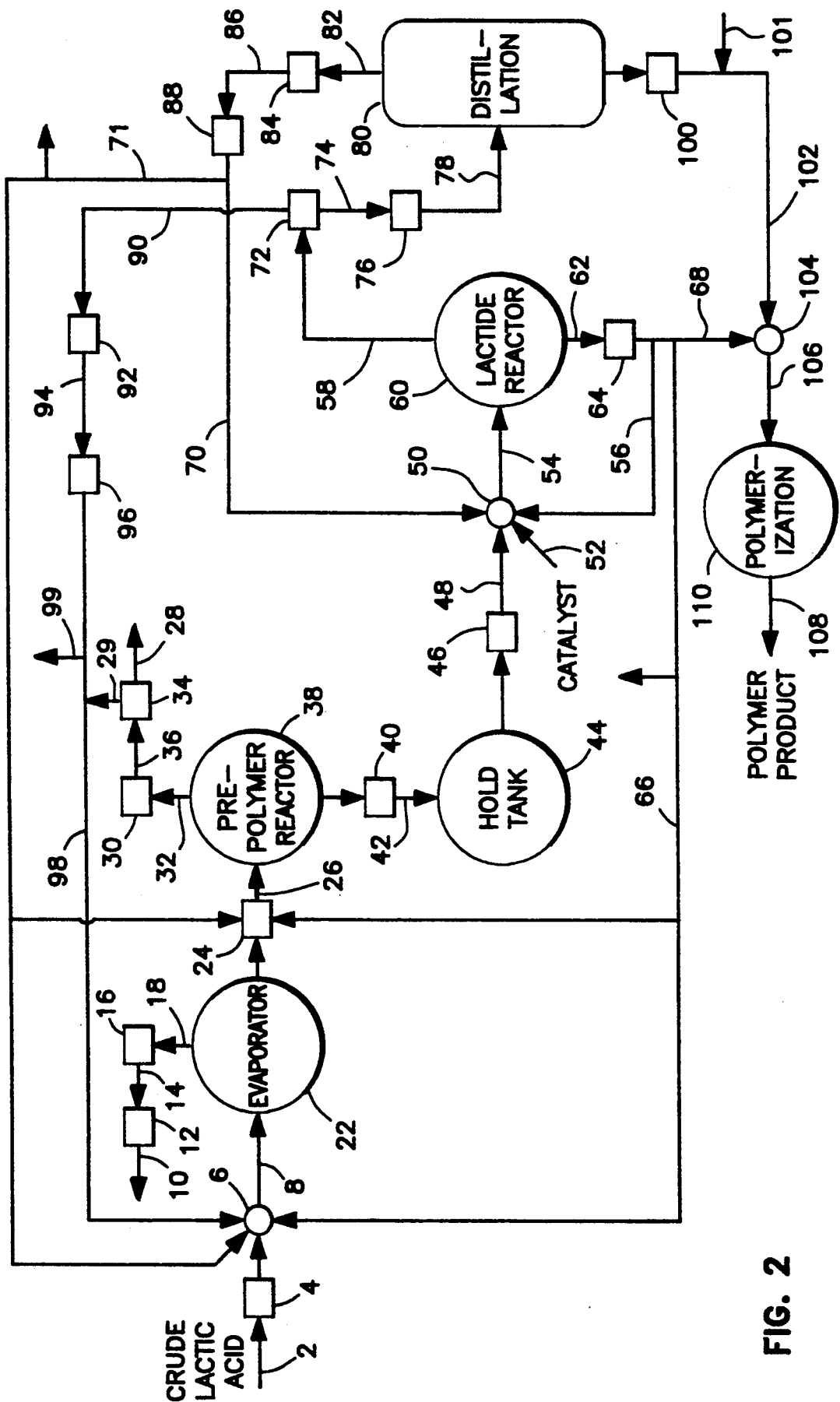
FIG. 2 is a detailed schematic representation of a preferred polylactide polymer production system in accordance with the present invention.

Referring now to the figures, FIG. 2 represents an overall schematic flowchart encompassing the preferred process disclosed herein. A crude lactic acid feed (2) is provided. The crude lactic acid feed may be of various grades. This could include USP, food grade, or any other solution in a hydroxylic medium. A hydroxylic medium is a medium which contains molecules having a hydroxyl group, mediums such as water, methanol, ethanol, propanol, butanol, isopropanol, isobutanol and the like, preferably having a number of carbon atoms in a range from 0-4, more preferably in a range from 0-2. The crude lactic acid can include from about 1% to about 99% by weight lactic acid, preferably, from about 1% to about 85%, more preferably from about 5% to about 50%. In a preferred embodiment, the crude lactic acid feed is a solution of about 15% lactic acid and about 85% water which is commercially produced. Many manufacturing processes for producing crude lactic acid are known in the art, such as Glassner et al., (European Patent Application, EP 393818, Oct. 24, 1990); G. Machell, "Production and Applications of Lactic Acid", *Industrial Chemist and Chemical Manufacturer*, v. 35, pp. 283-90 (1959) and Kirk Othmer, *Encyclopedia of Chemical Technology*, "Lactic Acid", v. 12, pp. 177-78 (2nd ed. 1963), which are incorporated herein by reference. In an alternative embodiment, the source of crude lactic acid (2) could be in the form of the ester of lactic acid of the general formula:

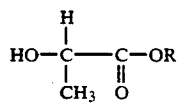

wherein R is a $C_1-C_8$ linear or branched alkyl. Preferred esters are methyl lactate, ethyl lactate, propyl lactate, butyl lactate, isopropyl lactate or isobutyl lactate or mixtures thereof. These esters are known intermediate products of the lactic acid process disclosed above and incorporated herein by reference. The crude lactic acid may be a mixture of these esters of lactic acid or a mixture of these esters of lactic acid or a mixture of one or more esters of lactic acid with lactic acid.

It is well known in the art that lactic acid includes two optical isomers, the L and D enantiomers. Either optical isomer or any combination thereof may be utilized as a crude lactic acid feed to the present reactor system. Furthermore, Applicants recognize that the crude lactic acid feed (2) may contain other impurities, such as color bodies, carbohydrates, proteins, amino acids, salts, metal ions, aldehydes, ketones, other carboxylic acids and esters of carboxylic acids. As will be explained in greater detail below, and in Example 1, the overall system incorporated in the present invention includes outlets for such impurities so that their impact on final polymer products is limited. These outlets are designated as (10), (28), (99), (71) and (66) on FIG. 2. Each will be discussed in greater detail below. Thus, in preferred embodiments the need for a more costly purified crude lactic acid feed is eliminated.

A fluid transfer mechanism (4) is provided to transport the crude lactic acid feed (2) through an optional in-line mixer (6) in a pipeline (8) to an evaporator system (22). The evaporator system (22) is utilized to concentrate the crude lactic acid feed (2) by removing water or any other solvent or hydroxylic medium which is used as a carrier for the lactic acid, such as methanol, ethanol or the like and any condensation reaction by-products. The evaporator system (22) may be of any conventional type known in the art, such as a multiple effect evaporator, a wiped film evaporator, a falling film evaporator, or any other conventional system. It is appreciated that such systems may be operated at pressures below atmospheric pressure, at atmospheric pressure or above atmospheric pressure with commensurate changes in heat load and operating temperatures. In a preferred embodiment, vacuum evaporation is utilized to reduce racemization. Water vapor or solvent vapor, in reference to the hydroxylic medium or condensation reaction by-product, is removed from the evaporator via a transfer line (18), and condensed in a condenser (16). The condensed liquid is transferred in a pipeline (14) to a fluid transfer mechanism (12), such as a pump or the like. The fluid transfer mechanism (12) transports the condensed water or solvent via pipeline (10) as a waste stream and is discarded.

The lactic acid may be concentrated to a weight percent lactic acid of about 50% to about 99%, preferably from about 75% to about 99% and more preferably from about 85% to about 99%. In a preferred embodiment, the evaporator system (22) is utilized to concentrate the crude lactic acid feed from about 15% lactic acid up to about 85% lactic acid.

The concentrated lactic acid is transferred via a fluid transfer mechanism (24) through a pipeline (26) to a prepolymer reactor (38). The prepolymer reactor (38) is essentially a second evaporator system of any conventional type which is utilized to further remove water or solvent from the crude lactic acid feed. A portion of the water or solvent vapor now also includes such water or solvent produced from the lactic acid polymerization reaction previously disclosed, the condensation reaction by-product. The water or solvent vapor leaves the prepolymer reactor (38) via line (32) and is condensed in a condenser (30). The condensed liquid is transferred via pipeline (36) to a transfer mechanism (34), with the transferred liquid comprising water or solvent with small amounts of lactic acid and other impurities present. This liquid may be discarded through line (28) or may be recycled through line (29) back to a static mixer or other mixing mechanism and fed once again through line (8) to the evaporator (22). The remaining liquid in the prepolymer reactor is continuously transferred via transfer mechanism (40) through line (42) to a hold tank (44).

As previously disclosed, it is well recognized in the art that lactic acid undergoes a condensation reaction to form polylactic acid, the polymer of lactic acid, as water is removed. In a preferred embodiment of the present system, the prepolymer reactor (38) is utilized to remove adequate water or solvent and condensation reaction by-product from the lactic acid to cause polymerization up to a molecular weight of about 100 to about 5000, preferably about 200 to about 3000, and more preferably about 400 to about 2500. As will be detailed in Example 2, which follows, in preferred embodiments the molecular weight of the polylactic acid leaving the prepolymer reactor impacts the chemical purity as well as the optical purity of the crude lactide. This in turn will affect the distillation and the properties of the final polymer product.

Applicants recognize that the evaporator system (22) and the prepolymer reactor (38) could be combined into a single system which provided removal of water or solvent sufficient to concentrate the lactic acid feed and also to polymerize such lactic acid. In the preferred embodiment, as discussed above, the systems are separate to take advantage of recognized differences in the composition of the vapor leaving the evaporator (22) at line (18) and the vapor leaving the prepolymer reactor (38) in line (32). The first step of concentrating the crude lactic acid in the evaporator (22) from 15% lactic acid to 85% lactic acid results in substantially pure water or solvent leaving the evaporator in line (18), which may be readily discarded without treatment. The vapor in line (32) leaving the prepolymer reactor (38) will necessarily contain lactic acid and other impurities which are carried over in the evaporation process. These impurities will preferably need to be recycled or treated before discarded. Thus, in the preferred embodiment, Applicants take advantage of the economic benefits of removing nearly pure water (or solvent) in the evaporator (22) and reduced recycle or waste treatment of the vapor leaving the prepolymer reactor (38).

Applicants also recognize that the evaporator system (22) and pre-polymer reactor (38) may be replaced by a series of batch evaporators that concentrate the lactic acid and produce pre-polymer. The series of batch systems may be operated to provide a net continuous supply of prepolymer.

The hold tank (44) is maintained at a temperature sufficient to keep the polylactic acid in a flowable liquid state. The hold tank (44) is, however, only a feature of the preferred embodiment, recognizing the control problems which may result from direct feed to the lactide reactor (60). This liquid is transferred via transfer mechanism (46) through a pipeline (48) to a static in-line mixer or other mixing mechanism (50). Within the mixing mechanism (50) a catalyst is added to the polylactic acid. Applicants recognize that any means of adding the catalyst to the polylactic acid would be appropriate; however, the static mixer (50) utilized in the preferred embodiment allows more even distribution of the catalyst within the liquid. The catalyzed polylactic acid is transferred via transfer line (54) to the lactide reactor (60). It is well recognized in the art that polylactic acid maintains a dynamic equilibrium with its depolymerization product, lactide, as represented by the reaction below:

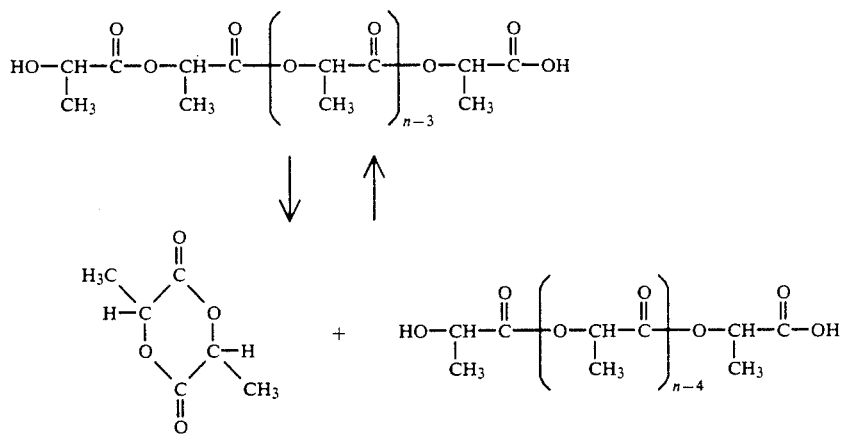

It is further recognized that this reaction is catalyzed by such compounds as tin dust, tin halide, tin oxide, and organic tin compounds derived from $C_1$-$C_{20}$ carboxylic acids, as disclosed by Muller in U.S. Pat. No. 5,053,522, which is incorporated herein by reference. Other metals, such as zinc, and their halides, oxides and organic compounds thereof, have been recognized by the art as possible catalysts for the lactide reaction. It is believed any metals of Groups IV, V or VIII of the Periodic Table and compounds thereof, are possible catalysts for generating lactide. In a preferred embodiment tin oxide is utilized as catalyst. In a most preferred embodiment the catalyst is activated prior to feed.

As lactide is generated within the lactide reactor (60), it is removed as a vapor continuously through line (58). The removal of lactide further drives the depolymerization reaction. It is believed that some high-boiling or non-volatile contaminants present in the feed to the entire system will concentrate in the lactide reactor and necessitate inclusion of a purge stream (62). Example 1 below details the effect of cationic impurities and Example 11, the detrimental effects of concentrating metal ions in the lactide reactor (60). It is believed other impurities would have a similar effect and necessitate the purge stream (62). A portion of this purge stream (56) may be recycled back to the static mixer (50) and recatalyzed and fed to the lactide reactor (60). Alternatively, the purge stream may be fed to the polymerization reactor (110) via line (68), if such polymer is desired. A transfer mechanism (64) is provided to transport the purge stream optionally to a point prior to the evaporator (22) such as the static mixer (6) or to the feed line (26) to the prepolymer reactor (38) or to waste through line (66) or to a static mixer (104) for polymerization in a polymerization reactor (110).

The lactide vapor leaving the lactide reactor (60) in line (58) is partially condensed in a condenser (72). The uncondensed vapor consists of residual lactic acid and water or solvent, along with some lactide which remains uncondensed. This vapor stream leaves the system through line (90) and is condensed in a condenser (92), the liquid thus being transferred by transfer mechanism (96) through line (94). This liquid may optionally be discarded through line (99) or recycled through line (98) back to the crude lactic acid static mixer (6). In the preferred embodiment, this stream is recycled in order to recover and utilize any lactic acid or lactide which is not condensed in partial condenser (72).

The condensed crude lactide leaving condenser (72) via line (74) is transferred via fluid transfer mechanism (76) through line (78) to a distillation system (80) for purification of the lactide. Applicants recognize that partial condensation may not be necessary and the crude lactide vapor may be fed directly to the distillation system (80). The distillate leaving the distillation system (80) in line (82) is composed of water or solvent, some residual lactic acid, and some lactide carryover. This stream is condensed in condenser (84) and transferred via fluid transfer mechanism (88), in line (86), and may be discarded or recycled back to a point prior to the evaporator (22), such as the static mixer (6) or the feed line (26) to the prepolymer reactor (38) through line (71), or more preferably recycled in line (70) back to the static mixer (50) to be recatalyzed and re-fed to the lactide reactor (60). This preferred embodiment allows minimization of waste by preventing loss of lactic acid or converted lactic acid to lactide from the feedstock.

The refined lactide is removed from the distillation system (80) via transfer mechanism (100) in line (102) and fed to a polymerization reactor (110). Applicants recognize that the distillation system (80) may include more than one distillation column or a flash drum.

Figure 9:
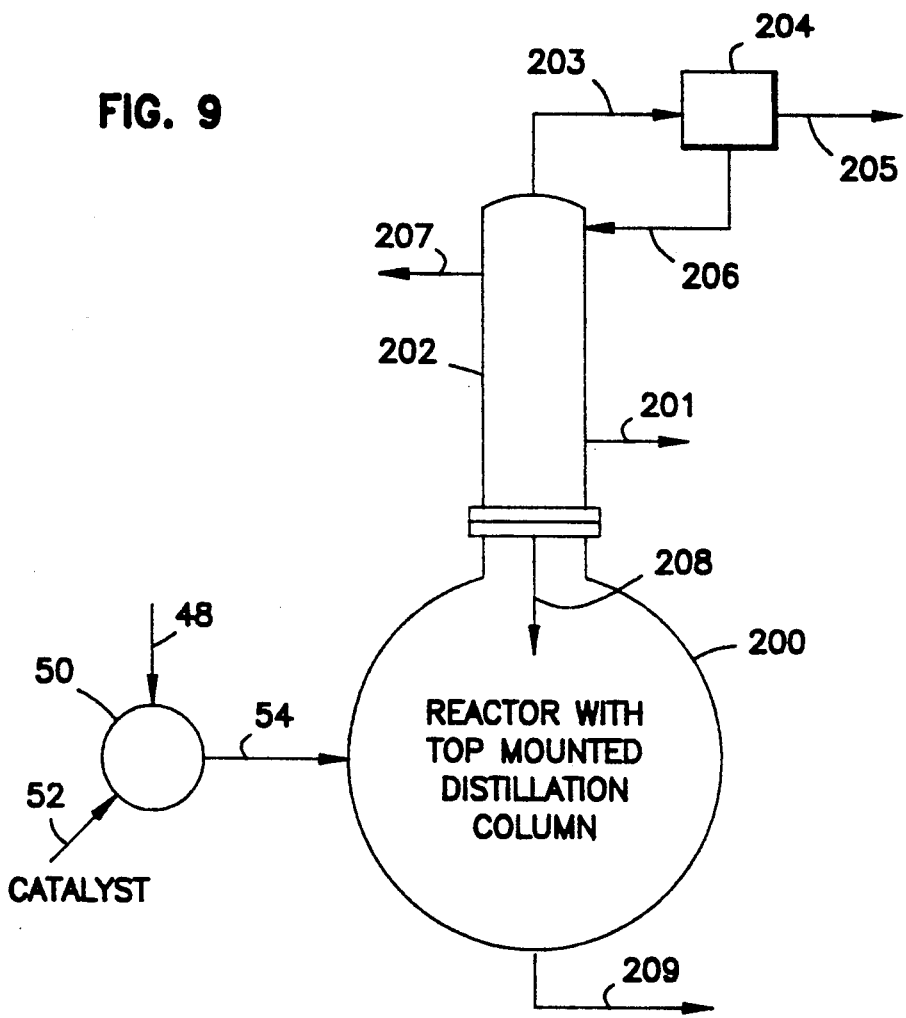
FIG. 9 is a schematic representation of a preferred lactide reactor/distillation column configuration.

Now referring to FIG. 9, a preferred combination reactor/top-mounted distillation column is depicted schematically. In this preferred embodiment, the prepolymer is fed to a static in-line mixer or other mixing mechanism (50) through a pipeline (48). Within this mixing mechanism (50) a catalyst is added to the polylactic acid or prepolymer through a pipeline (52). The catalyzed prepolymer is then fed to the combined reactor/top-mounted distillation column (200) through a pipeline (54). As disclosed above, the well-recognized dynamic equilibrium between the polylactic acid and its depolymerization product, lactide, results in an approximate concentration of 5 weight % lactide within the reactor portion of the reactor with top-mounted distillation column (200). In the presence of heat, the lactide is vaporized within the lactide reactor with top-mounted distillation column (200) and travels directly as a vapor into the top-mounted distillation column indicated by (202). Within such distillation column (202) the crude lactide is refined and purified. A low-boiling overhead stream leaves the distillation column in a pipeline (203) to a condenser (204). A portion of the condensed low-boiling overhead stream is removed from the system via a pipeline (205) while a second portion of said stream is refluxed back to the distillation column through a pipeline (206). The low-boiling overhead stream is composed of water or solvent, some residual lactic acid and some lactide carry over.

Components within the distillation column that boil at a temperature higher than lactide create a high-boiling bottoms stream which, in the present configuration, travels down distillation column (202) directly into the reactor with top-mounted distillation column (200) as generally indicated by (208) where it is further reacted to form additional lactide. A re-boil tray may optionally be located in the bottom portion of the top-mounted distillation column (202) to facilitate purification. The substantially purified lactide stream is removed as an intermediate-boiling sidedraw stream from distillation column (202) through a line (201). The substantially purified lactide may be cooled and/or fed to a polymerization process as disclosed above. As previously disclosed, it may be necessary to subject the substantially purified lactide to further purification in a second distillation system prior to polymerization. One of skill in the art would make this decision based on design and operation of the first distillation system in light of desired final polymer properties. Applicants recognize it may be necessary to withdraw a purge stream from the bottom of the reactor with top-mounted distillation column (200). This may be accomplished via a pipeline (209) as was indicated above in the description of the process of FIG. 2. The overhead low-boiling stream, leaving the system in pipeline (205), may be discarded or recycled back to an earlier point in the process to recover the lactic acid, lactide or any other valuable component present in said stream. Alternatively, a sidedraw stream may be withdrawn from the column in a pipeline (207) at a point where lactic acid and linear dimer are high in concentration. This stream may be recycled back to the reactor with top-mounted distillation column (200) or, alternatively, fed back to the catalyst-mixing mechanism (50) through a pipeline (48). The presence of dimer at a point above the point at which lactide is withdrawn as a sidedraw stream is due to ring-opening decomposition reactions.

The polymerization process may be of any conventional design known to the art, such as that disclosed by J. Leenslag and A. Pennings, "Synthesis of High Molecular Weight Poly (L-lactide) Initiated with Tin 2-Ethylhexanoate", *Makromol. Chem.*, v. 188, pp. 1809–14 (1987) and F. Kohn et al., "The Ring-Opening Polymerization of D,L-Lactide in the Melt Initiated with Tetraphenyltin, *J. Applied Polymer Science*, v. 29, pp. 4265–77 (1984), which are incorporated herein by reference.

An alternative source of crude lactic acid for the process disclosed above is an ester of lactic acid. Applicants have discovered that processing an ester of lactic acid to form a polylactide polymer requires alterations of the above-disclosed general process. These modifications or alternative processing steps are described below in detail. It is recognized, however, that the general disclosure utilizing lactic acid as the crude feed to the general overall process as disclosed in FIG. 2 and FIG. 9 and described in detail above, is equally applicable to the processes disclosed below with the modifications incorporated therein. Modifications to the overall general process and preferred embodiments of an overall process for feeding an ester of lactic acid to said process in producing a purified lactide which may be subsequently fed to a polymerization system, as indicated above, are depicted generally in FIGS. 10, 11 and 12 and described in detail below.

An ester of lactic acid suitable for use in the process of the present invention may generally be described by the formula:

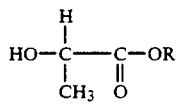

wherein R is a $C_1$–$C_8$ linear or branched alkyl. Preferred esters of lactic acid include methyl lactate, ethyl lactate, propyl lactate, butyl lactate, isopropyl lactate, isobutyl lactate and mixtures thereof. The condensation of an ester of lactic acid results in formation of a low molecular weight prepolymer. The polymerization reaction is generally indicated by the formula below:

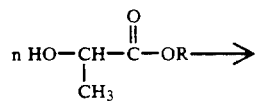

Ester of Lactic Acid

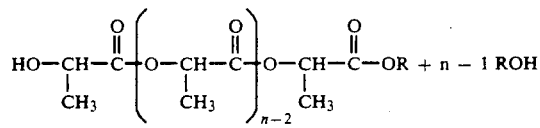

While step n of said polymerization reaction is represented by:

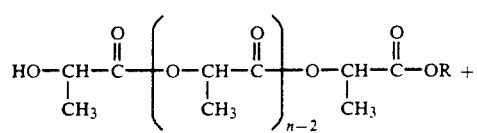

-continued

Ester of Lactic Acid

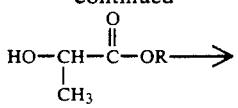

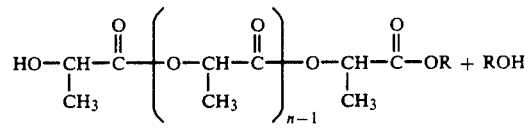

As the polylactic acid chain lengthens, the polymerization reaction rate decelerates and the depolymerization reaction to form lactide accelerates until equilibrium is reached. This equilibrium is represented by:

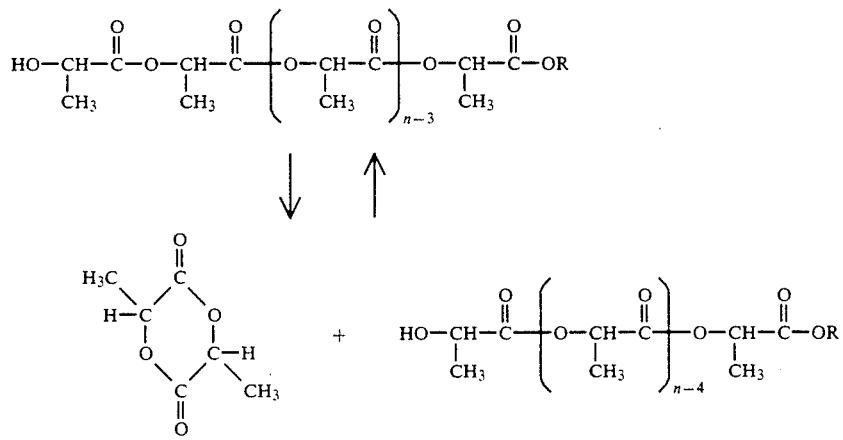

As indicated by the above reactions, polymer chains may contain an ester end group wherein said polymer may be defined as a polylactic ester polymer. For the sake of clarity, polylactic acid or polylactic acid molecules are defined herein to include polylactic acid molecules formed from the polymerization of lactic acid as disclosed previously and polylactic ester polymers as disclosed above produced from an ester of lactic acid feed.

Applicants believe that the above reactions represent the overall reaction system. However, it is also recognized that on a molecular basis, many other side reactions or transesterification reactions will be ongoing. For example, two ester of lactic acid molecules may couple to form a lactide molecule and two condensation reaction by-product molecules without actually going through or maintaining the structure of a polylactic acid molecule as defined above. Thus, when applicants disclose forming polylactic acid molecules or molecules of polylactic acid having an average molecular weight of between about 100 to about 5,000 and the polylactic acid molecules are at least partially depolymerized in the presence of catalyst means for catalyzing the depolymerization of the polylactic acid molecules, it is recognized that this is the overall reaction of the system to form lactide from an ester of lactic acid or from lactic acid itself. It is recognized that on a molecular basis, a portion of the lactic acid ester molecules may react directly to form lactide without ever truly forming polylactic acid molecules.

As detailed in Example 15 below, applicants have also found that the condensation reaction to form polylactic acid or lactide from an ester of lactic acid requires a catalyst. It is believed that in the condensation of lactic acid to form a low molecular weight prepolymer, the acid group supplies protons which act as a catalyst. When using an ester of lactic acid there are no such acid groups to supply protons. Thus, a process utilizing an ester of lactic acid as a feed material requires a catalyst at the outset, in order to catalyze the condensation reaction. Catalysts believed useful in preferred embodiments of the process of the present invention include any catalyst which contains some acid functionality (provides a proton source) or Lewis acid functionality (provides positive charge density). Catalysts such as those used in other polyester condensation and esterification reactions are also useful. For example, zinc acetate, manganese acetate, calcium acetate, sodium acetate, antimony triacetate, and many others as disclosed by K. Ravindranath et al. in *Chem. Eng. Science*, v 41, pp. 2197-2214 (1986), which is incorporated herein by reference. Specific catalysts would include tin(II) ethylhexanoate, p-toluene sulfonic acid, Fascat® 9100 and Fascat® 9102 (Fascat® catalysts available commercially from Atochem North America Inc, Philadelphia, Pa.). Supported catalysts or solid catalysts with some acid functionality or Lewis acid functionality would also be useful. These would include the solid catalysts disclosed by Bellis et al. in PCT Application No. WO 92/00292, which is incorporated herein by reference. A preferred catalyst is, however, the supported polymeric resin catalysts available from Rohm and Haas commercially under the tradename Amberlyst® as a series of catalysts. Specific examples utilizing such Amberlyst® catalysts are outlined below. Also useful are the solid catalysts of the type described by Sir John Meurig Thomas in *Scientific American*, April, 1992, pp. 112-118. Mineral acid catalysts are also known to catalyze the above esterification reactions and would be useful in these applications.

Figure 10:
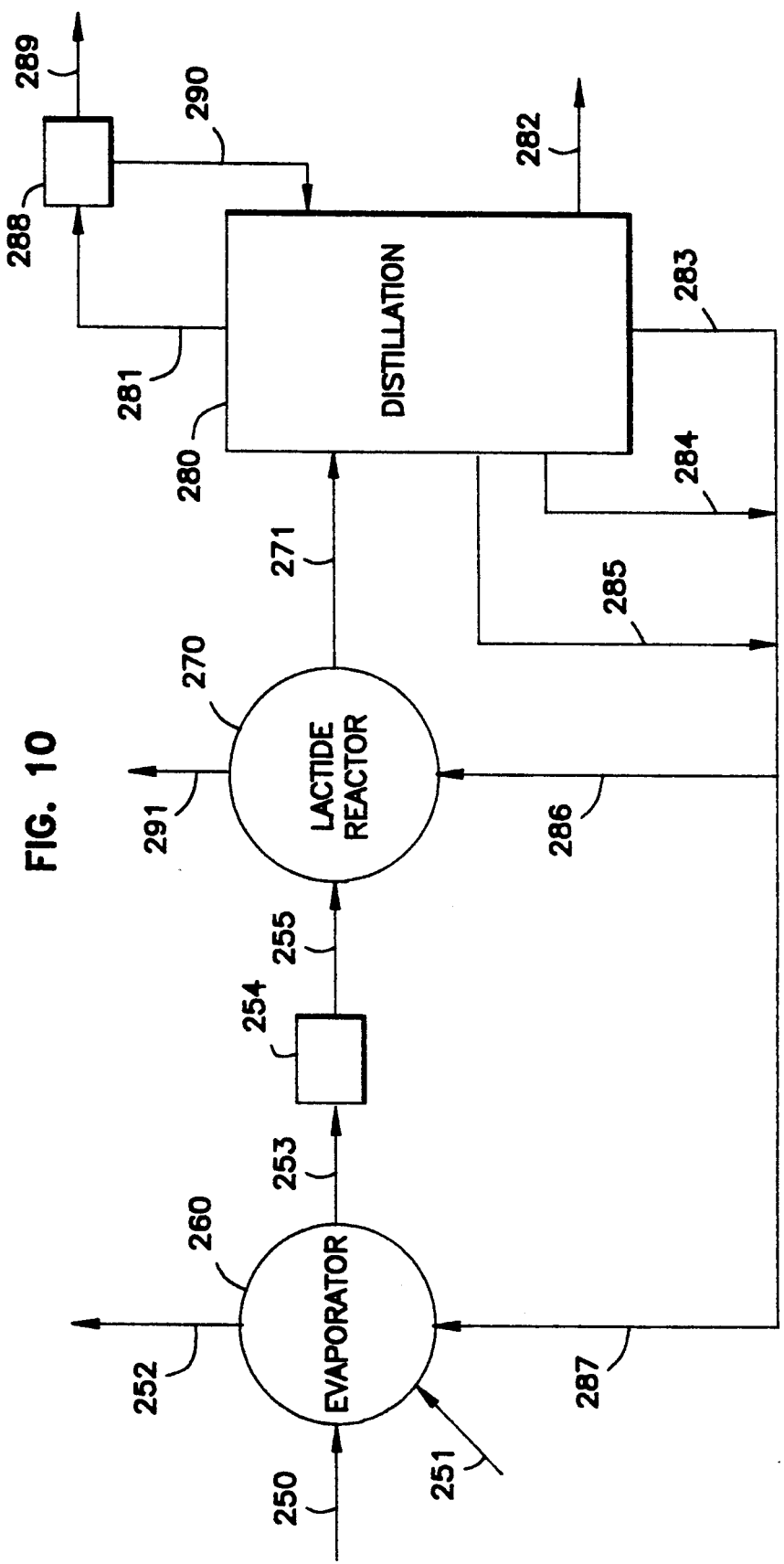
FIG. 10 is a schematic diagram of a preferred alternative polylactide polymer production system.

Now referring to FIG. 10, which represents the first change in the overall process disclosed in FIG. 2 to improve the process for use with an ester of lactic acid as a feed source, an ester of lactic acid is fed to an evaporator (260) in a pipeline (250). A soluble homogeneous catalyst such as those outlined above is fed to the evaporator through a pipeline (251). Alternatively, the catalyst and ester of lactic acid could be fed together into a static mixer prior to being fed to the evaporator (260). Within the evaporator (260) the ester of lactic acid is heated, and the hydroxylic medium, within which the ester of lactic acid may be in solution, is evaporated. Optionally, the ester of lactic acid may be without a hydroxylic medium. It is recognized that within the evaporator some condensation of the ester of lactic acid will occur to form polylactic acid and some lactide. The resulting condensation reaction by-product, which would include compounds of the formula ROH depending upon the ester of lactic acid used, would be evaporated and taken from the system through a pipeline (252). The degree to which condensation occurs would depend upon operating conditions and residence time within the evaporator (260). The evaporator (260) may be operated at atmospheric pressure or more preferably under reduced pressure to allow for lower temperature of operation and evaporation. The concentrated ester of lactic acid within the evaporator (260), along with any formed polylactic acid or lactide, is transferred through a pipeline (253) by a fluid transfer mechanism (254) into a pipeline (255) which feeds a lactide reactor (270).

Within the lactide reactor (270) the reactions to form lactide are continued, preferably under conditions of elevated temperature and reduced pressure. The mixture of lactide and polylactic acid within the lactide reactor (270) is removed through a pipeline (271) and fed to a distillation system (280). The mixture of lactide and polylactic acid is a crude lactide. The crude lactide will also contain low molecular weight oligomers of lactic acid or the ester of lactic acid, including DP2 and DP3. Within the distillation system (280) the crude lactide is purified. The purified lactide is removed as an intermediate-boiling sidedraw stream from the distillation system (280) through a pipeline (282). As disclosed in FIG. 2, this purified lactide may be fed to a polymerization process.

Within the distillation system (280) at least two other fractionated streams are created. A low-boiling overhead stream leaves distillation system (280) through a pipeline (281) where it is condensed in a condenser (288) with a portion of the condensed low-boiling overhead stream being removed from the system through a pipeline (289) and the remainder utilized as a reflux stream back to distillation system (280) through a pipeline (290). The low-boiling overhead stream will contain components that are lower-boiling than lactide. They may include water, dimer of lactic acid and other oligomers, and a concentration of lactide. The concentration of lactide in the overhead stream will be varied depending on distillation system (280) operation. It is believed that the concentration of low-boiling materials which would be in the overhead stream other than lactide will be small, therefore it may be necessary to reflux a high quantity of lactide in the overhead low-boiling stream in order to purify the lactide.

Figure 11:
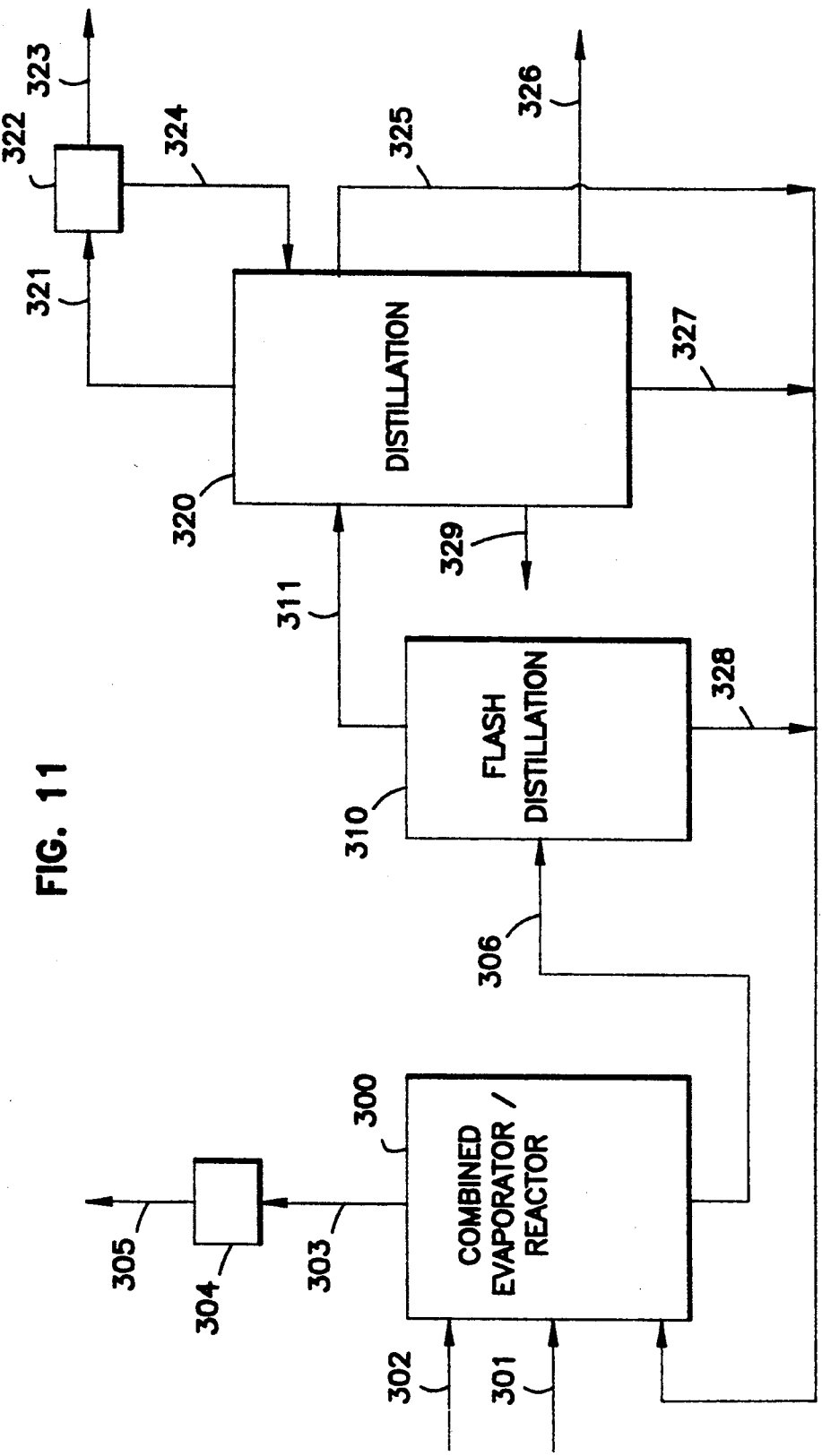
FIG. 11 is a schematic representation of a preferred alternative polylactide polymer production system incorporating catalyst removal; and, FIG. 12 is a schematic representation of a preferred alternative polylactide polymer production system incorporating a catalyst bed reactor system.
Figure 12:
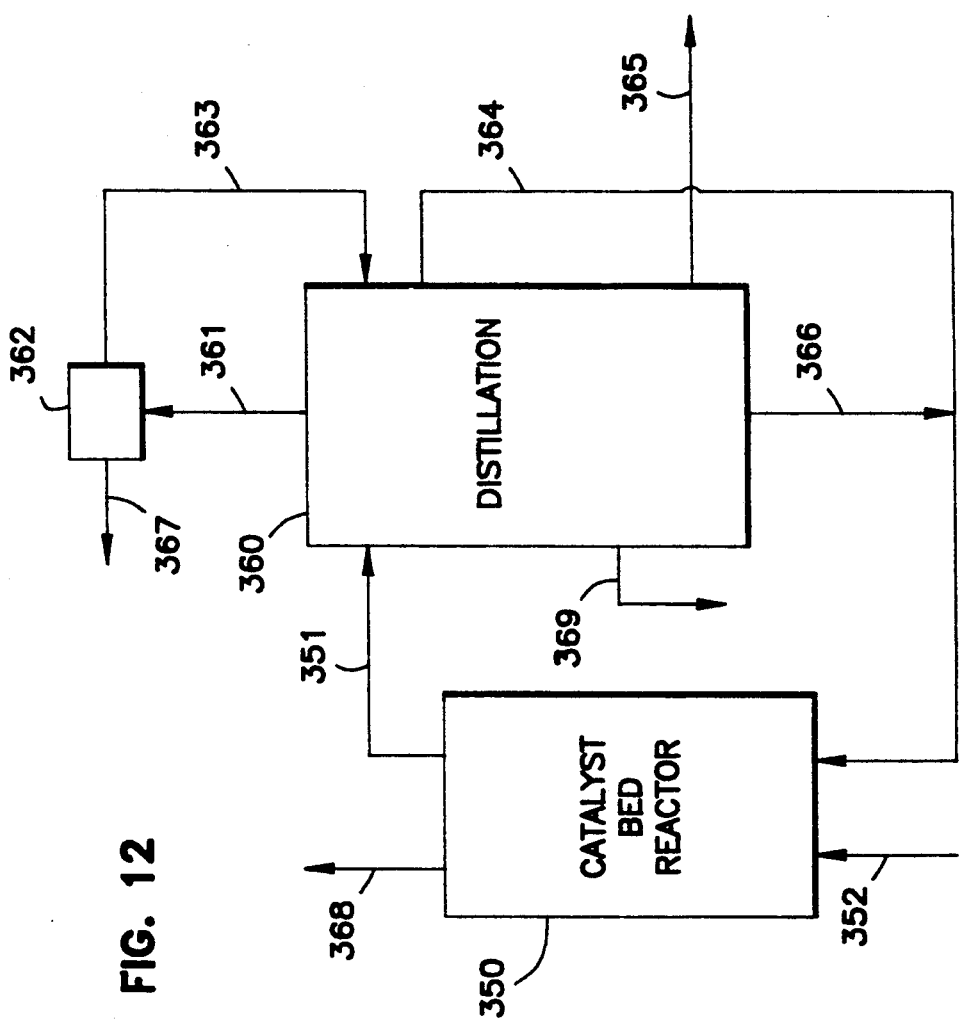

A high-boiling bottoms stream is removed from the distillation system (280) through a pipeline (283). This high-boiling bottoms stream will generally include those materials higher-boiling than lactide, along with a concentration of lactide which will vary depending upon the operation of distillation system (280). The high-boiling bottoms stream may be recycled back to the lactide reactor (270) via a pipeline (286) or, alternatively, to the evaporator (260) through a pipeline (287). In an alternative embodiment, other sidedraw streams may be removed from the distillation system (280). These are generally indicated by a pipeline (284) and a pipeline (285). With proper design these sidedraw streams may be located at a point in the distillation column where a component such as DP2 or the dimer of lactic acid is in high concentration and may be withdrawn from the distillation system (280) and recycled back to the lactide reactor (270) or evaporator (260). FIGS. 11 and 12 are directed to process modifications to remove catalysts from the crude lactide stream prior to purification.

Now turning to FIG. 11, a preferred overall system utilizing an ester of lactic acid feed and a soluble homogeneous catalyst with the crude lactide being subjected to a flash distillation to remove said homogeneous catalyst prior to distillation of the lactide. An ester of lactic acid is fed to a combined evaporator/reactor (300) through a pipeline (302). The ester of lactic acid may be any mixture of esters of lactic acid and may also be in a hydroxylic medium as a solution. A catalyst is fed to the combined evaporator reactor (300) through a pipeline (301). This catalyst may be any acid-functional or Lewis acid-functional soluble catalyst as detailed above. Alternatively, the ester of lactic acid and soluble catalyst may be combined in a mixing mechanism or static mixer prior to being fed to the combined evaporator/reactor (300). Within the combined evaporator/reactor (300), sufficient residence time is allowed to both condense the ester of lactic acid to form a polylactic acid and to depolymerize the polylactic acid to form lactide. The relative concentrations of the polylactic acid and lactide will depend upon temperature and residence time as the system approaches equilibrium as outlined above. Condensation reaction by-product of the general formula ROH is removed from the combined evaporator/reactor (300) through a pipeline (303) as a vapor and condensed in a condenser (304) with subsequent removal from the system in a pipeline (305). The lactide and polylactide reaction product or crude lactide which was formed in the combined evaporator reactor (300) is removed from said reactor (300) in a pipeline (306) and fed to a flash distillation system (310). The flash distillation system (310) is designed with minimum residence time and preferably low pressure operation to quickly flash a quantity of the lactide from the mixture. The soluble catalyst remains with the liquid stream which is removed from the bottom of the flash distillation system through a pipeline (328) and recycled back to the combined evaporator/reactor (300). The lactide which is flashed as a vapor in the flash distillation system (310) is removed through a pipeline (311) and fed to a distillation system (320). This stream contains lactide and some polylactic acid of low degree of polymerization and low boiling impurities. The distillation system (320) may be any distillation system as disclosed above as, for example, in FIG. 10.

The mixture of lactide and polylactic acid is a crude lactide. The crude lactide will also contain low molecular weight oligomers of lactic acid or the ester of lactic acid, including DP2 and DP3. Within the distillation system (320) the crude lactide is purified. The purified lactide is removed as an intermediate-boiling sidedraw stream from the distillation system (320) through a pipeline (326). As disclosed in FIG. 2, this purified lactide may be fed to a polymerization process.

Within the distillation system (320) at least two other fractionated streams are created. A low-boiling overhead stream leaves distillation system (320) through a pipeline (321) where it is condensed in a condenser (322) with a portion of the condensed low-boiling overhead stream being removed from the system through a pipeline (323) and the remainder utilized as a reflux stream back to distillation system (320) through a pipeline (324). The low-boiling overhead stream will contain components that are lower-boiling than lactide. They may include water, dimer of lactic acid and other oligomers, and a concentration of lactide. The concentration of lactide in the overhead stream will be varied depending on distillation system (280) operation. It is believed that the concentration of low-boiling materials which would be in the overhead stream other than lactide will be small, therefore it may be necessary to reflux a high quantity of lactide in the overhead low-boiling stream in order to purify the lactide.

A high-boiling bottoms stream is removed from the distillation system (320) through a pipeline (327). This high-boiling bottoms stream will generally include those materials higher-boiling than lactide, along with a concentration of lactide which will vary depending upon the operation of distillation system (320). The high-boiling bottoms stream may be recycled back to the combined evaporator/reactor (300) via a pipeline (327). In an alternative embodiment, other sidedraw streams may be removed from the distillation system (320). These are generally indicated by a pipeline (329). With proper design these sidedraw streams may be located at a point in the distillation column where a component such as DP2 or the dimer of lactic acid is in high concentration and may be withdrawn from the distillation system (320) and recycled back to the combined evaporator/reactor (320).

Now referring to FIG. 12, which is a preferred embodiment for utilizing an ester of lactic acid feed material to form polylactide without the instability created by the presence of a catalyst within the distillation system. Within this system a solid supported catalyst or solid catalyst is utilized in a catalyst bed reactor system (350). The catalyst bed reactor system may be filled with any solid supported catalyst or solid, insoluble catalyst as disclosed above which has an acid functionality or Lewis acid functionality. There are many ways in which to operate the catalyst bed reactor system which are generally known in the art and include a fixed bed, an ebbulated bed, or a fluidized bed system. Key to operation is preventing the catalyst from leaving the catalyst bed reactor (350) and entering the distillation system (360) as indicated in FIG. 12. This is generally known in the art and may be accomplished utilizing screens and filters on the outlet from said catalyst bed reactor (350).

Within this alternative embodiment, the ester of lactic acid or the ester of lactic acid in hydroxylic medium is fed to the catalyst bed reactor system (350) through a pipeline (352). This material may be fed either as a liquid or a vapor. Within the catalyst bed reactor system (350), the above-stated reactions are allowed to occur in the presence of a solid supported or solid catalyst. The concentration of lactide and polylactide will vary, depending upon residence time within the catalyst bed system, the removal of condensation reaction by-product, the catalyst selected, along with temperature and pressure. The condensation reaction by-product may be flashed and removed through a pipeline (368) from the catalyst bed reactor system or, alternatively, may remain a liquid and be fed to the distillation system (360) through a pipeline (351).

The mixture of lactide and polylactic acid leaving catalyst bed reactor (350) is a crude lactide. The crude lactide will also contain low molecular weight oligomers of lactic acid or the ester of lactic acid including DP2 and DP3, which are collectively referred to as, and included in, the definition of polylactic acid. It may also contain condensation reaction by-product. This material is fed to distillation system (360). Within the distillation system (360) the crude lactide is purified. The purified lactide is removed as an intermediate-boiling sidedraw stream from the distillation system (360) through a pipeline (365). As disclosed in FIG. 2, this purified lactide may be fed to a polymerization process.

Within the distillation system (360) at least two other fractionated streams are created. A low-boiling overhead stream leaves distillation system (360) through a pipeline (361) where it is condensed in a condenser (362) with a portion of the condensed low-boiling overhead stream being removed from the system through a pipeline (367) and the remainder utilized as a reflux stream back to distillation system (360) through a pipeline (363). The low-boiling overhead stream will contain components that are lower-boiling than lactide. They may include water, dimer of lactic acid and other oligomers, and a concentration of lactide. The concentration of lactide in the overhead stream will be varied depending on distillation system (360) operation. It is believed that the concentration of low-boiling materials which would be in the overhead stream other than lactide will be small, therefore it may be necessary to reflux a high quantity of lactide in the overhead low-boiling stream in order to purify the lactide.

A high-boiling bottoms stream is removed from the distillation system (360) through a pipeline (366). This high-boiling bottoms stream will generally include those materials higher-boiling than lactide, along with a concentration of lactide which will vary depending upon the operation of distillation system (360). The high-boiling bottoms stream may be recycled back to the catalyst bed reactor (350) via a pipeline (366). In an alternative embodiment, other sidedraw streams may be removed from the distillation system (360). These are generally indicated by a pipeline (369). With proper design these sidedraw streams may be located at a point in the distillation column where a component such as DP2 or the dimer of lactic acid is in high concentration and may be withdrawn from the distillation system (360) and recycled back to the catalyst bed reactor (350).

Applicants recognize that in a preferred embodiment one may choose to add a non-lactide monomer to the purified lactide leaving the distillation system (80). This co-monomer may be added via line (101). The co-monomers are fed to the polymerization reactor (110) and polymerized to form a co-polymer. Many co-polymers of polylactide are known to the art. These include P. Dave, N. Ashar, R. Gross, S. McCarthy, "Survey of Polymer Blends Containing Poly (3-hydroxybutyrate-co-16% hydroxyvalerate), *Polymer Preparation, American Chemical Society*, v. 31 (1), pp. 442-3 (1990); B. Riedl and R. Prud'homme, "Thermodynamic Study of Poly(vinyl chloride)-Polyester Blends by Inverse Gas Phase Chromatography", *J. Polymer Science*, Part B, vol. 24(11), pp. 2565-82 (1986); H. Younes and D. Cohn, "Phase Separation in Poly(ethylene glycol)-/Poly(lactic acid) Blends, *European Polymer J.*, v. 24(8), pp. 765-73 (1988); Smith et al. (European Patent Application, EP 209371, Jan. 21, 1987); Pines et al. (European Patent Application EP 109197, May 23, 1984); J. Zhu, Y. Shao, W. Sui, S. Zhang, H. Xiao and X. Tao, "Homopolymers and Copolymers of Glycolide and Lactide", C-MRS Int. Symp. Proc. Meeting Date 1990, v. 3, pp. 387-90 (1990); Jarrett et al. (U.S. Pat. No. 4,788,979); and, T. Nakamura et al., "Surgical Application of Biodegradable Films Prepared from Lactide-Epsilon-Caprolactone Copolymers, *Advanced Biomaterials*, 7 (Biomater. Clin. Appl.) pp. 759-64 (1987), which disclosures are incorporated herein by reference. Applicants believe any co-polymers of polylactide may be produced from the process disclosed herein.

Fluid transfer mechanisms disclosed throughout this detailed description would normally be a pump. However, Applicants recognize that through design choices other mechanisms for transfer, such as gravitational flow, may also be utilized.

Applicants further recognize that the preferred overall system described herein is a complex combination of many known chemical engineering unit operations. So that the benefit of the overall combination may be recognized, Applicants herein disclose in further detail the selection, operation, and benefits of selecting such unit operations, along with actual laboratory experimental results exemplifying the disclosed advantages.

As previously stated, the crude lactic acids fed to this process (2) may be made up of L-lactic acid or D-lactic acid, or combinations thereof. The composition of the feed, however, does not translate directly through the entire process to define the composition of the polymer product leaving the polymerization reactor (110) through line (108). Applicants recognize that racemization, or conversion of one optical enantiomer to the other, may occur. It is believed that such racemization is driven by such factors as temperature, pressure, time at a given temperature or pressure, the presence of catalysts or impurities, and relative concentrations of the two enantiomers at any given time. The degree of racemization is defined herein by the percent conversion of the optical enantiomer that is present in excess of 50%. As an equation, this calculation would be defined as:

$$\text{degree of racemization } (\%) = 100 - \left( \frac{\% \text{ of majority enantiomer} - 50}{50} \times 100 \right)$$

Thus, an initial composition of 75% L and 25% D which results after racemization to a 50% L, 50% D mixture would equate to a degree of racemization of 100%. In all instances, no matter what initial composition, a 100% degree of racemization coincides with a composition of 50% each enantiomer, or optical inactivity. This recognizes the tendency toward equilibrium at a 50% concentration of each enantiomer, corresponding to optical inactivity. In the most preferred embodiment of the system, each unit operation is controlled to a degree that allows production of a purified lactide mixture with selected chemical and optical composition. The optical composition of the lactide mixture is determined by the relative abundance of D- and L-lactic acid sub-units in the polylactic acid within the lactide reactor. As recognized by Nieuwenhuis et al. in U.S. Pat. No. 5,053,485, the disclosure of which is incorporated herein by reference, the blend of lactide isomers used to produce the polymer affects the physical properties of the polymer, including the biodegradability.

In a preferred embodiment, the evaporator (22) is operated to minimize residence time so that there is little or no effect on optical purity. The prepolymer reactor (38) is also operated to minimize racemization. This includes reducing the residence time within the reactor.

The crude lactide produced in the lactide reactor (60) will be a mixture of the three possible lactides which may be generated from L- and D-lactic acid. These include L-lactide, D-lactide, and meso-lactide.

As detailed in Example 3 hereinbelow, the concentration of catalyst added to static mixer (50) also affects the degree of racemization and composition of the crude lactide product. In a preferred embodiment, the catalyst concentration level is adjusted based on desired properties of the final polymer product.

Applicants have discovered, and detailed in Example 12, that the quality of the crude lactide charged to the distillation system has a significant effect on the operation of said system. In particular, acidic impurities such as lactic acid and low molecular weight oligomers, which are formed by ring opening reactions of lactic acid or water with lactide, can cause premature polymerization in the distillation system. In a preferred embodiment, applicants believe such side reactions may be controlled by partially condensing the crude vapor prior to feeding to distillation to remove impurities.

The distillation system (80) may also be operated to control racemization of the lactide and other side reactions. In a preferred embodiment, this system is designed to minimize racemization by utilizing a packed column distillation system which minimizes liquid holdup, along with a thermal-siphon reboiler which limits residence time of the bottom liquids, and utilizing a minimum reflux ratio to further reduce holdup time in the column. It is, however, recognized that other distillation systems may be utilized with varying impact on the optical purity of the purified lactide and resultant polymer product.

In a preferred embodiment, the distillation system (80) is utilized as a purification step for the lactide so that crystallization of the crude lactide is unnecessary in order to produce a lactide product of suitable purity for polymerization. The lactide reactor (60) is also designed in a preferred embodiment, maximizing surface area between liquid and vapor so that liquid lactide can more easily vaporize. This allows for rapid removal of the generated lactide, which in turn further drives the reaction. Furthermore, as recognized by DeVries in U.S. Pat. No. 4,797,468, which is incorporated herein by reference, a system which utilizes purification steps other than crystallization increases yield. The use of distillation as a purification step also prevents the need to handle solids with the problems with equipment and contamination inherent in such operations.

Applicants have found that utilizing an ester of lactic acid, whether alone or in a hydroxylic medium requires modifications to the overall process to accomodate such feeds. Thus, in a preferred embodiment when an ester of lactic is utilized as a feed material, a catalyst with acid functionality whether in terms of a true acid which is a source of protons, or a Lewis acid which is a source of positive charge density, is used to facilitate the condensation reaction. The presence of the catalyst with acid functionality renders the crude lactide relatively unstable during purification by distillation. In a preferred embodiment, the decomposition of the lactide during purification is avoided by utilizing an insoluble, solid supported catalyst. Alternatively, a soluble homogenous catalyst may be utilized in forming the crude lactide, however, the crude lactide is then subjected to a flash distillation with the catalyst being removed in the bottoms high-boiling stream.

In all embodiments of the present invention, applicants utilize distillation as the final purification means to produce a polymer grade lactide. Several possible distillation processes are disclosed above. Applicants believe each of these systems could be utilized in an overall process which utilizes lactic acid in an aqueous or hydroxylic medium, an ester of lactic acid, an ester of lactic acid in a hydroxylic medium, mixtures of esters of lactic acid, an ester of lactic acid in mixture with lactic acid or a mixture of esters of lactic acid with lactic acid as the feed material for producing the crude lactide to be distilled. One of skill in the art utilizing principles of system design and operation would thus adjust such variables based on the feed composition and resultant purity required.

The following examples further detail advantages of the system disclosed herein:

EXAMPLE 1

Figure 3:
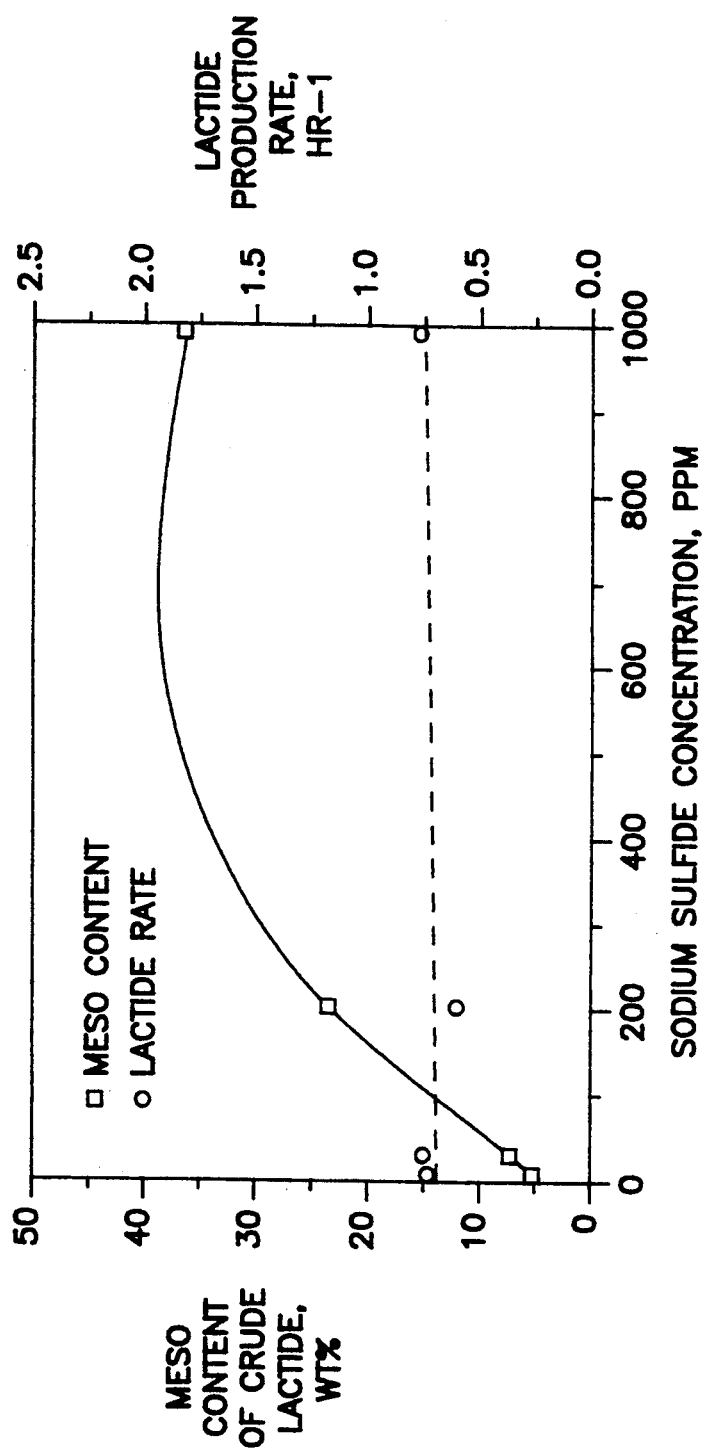
FIG. 3 is a graph showing the effects of sodium on lactide production rate and optical purity.

Effect of Cationic Impurities on Optical Purity $Na_2S$ was added at levels of 20, 200, and 1000 ppm to purified lactic acid (Purac heat stable grade) of composition 85% L-lactic acid and 15% water. The lactic acid was then polymerized to form PLA with a number average molecular weight of about 650 g/mol. $H_2S$ was removed under vacuum while the PLA was being formed, leaving $Na^+$ ions in solution. The PLA was then used to generate lactide at 10 mm Hg with 0.05 wt. % SnO catalyst (Aldrich cat. no. 24,464-3, Tin (II) oxide, 99+%) and a constant heat input, allowing reactor temperature to float. The results are shown in the following table and in FIG. 3:

| EFFECT OF SODIUM ON LACTIDE PRODUCTION RATE AND OPTICAL PURITY | | | |
|---|---|---|---|
| Sodium sulfide, ppm | Production rate, $hr^{-1}$ | Meso, wt % | Temp (°C.) |
| 0 | 0.73 | 5.3 | 234 |
| 20 | 0.74 | 7.5 | 235 |
| 200 | 0.60 | 23.4 | 238 |
| 1000 | 0.76 | 36.6 | 233 |

The table shows that although the addition of sodium had no effect on the lactide production rate or on the reaction temperature, it did have a pronounced effect on the amount of meso-lactide present in the crude product.

Applicant believes other cationic species will behave in a similar fashion.

A practical implication of this example is that it will be necessary in any continuous process, where management of optical composition is desired, to provide a mechanism for removing ionic impurities from the reactor. The ionic impurities will be present in all sources of lactic acid to some extent, and will concentrate in the liquid within the lactide reactor (reactor bottoms) over time. In a preferred embodiment of the present invention a purge stream is provided to accomplish this objective. An alternative would be to shut the system down periodically and dump or recycle the reactor bottoms.

EXAMPLE 2

The Effect of PLA Molecular Weight on Optical Purity

Figure 4:
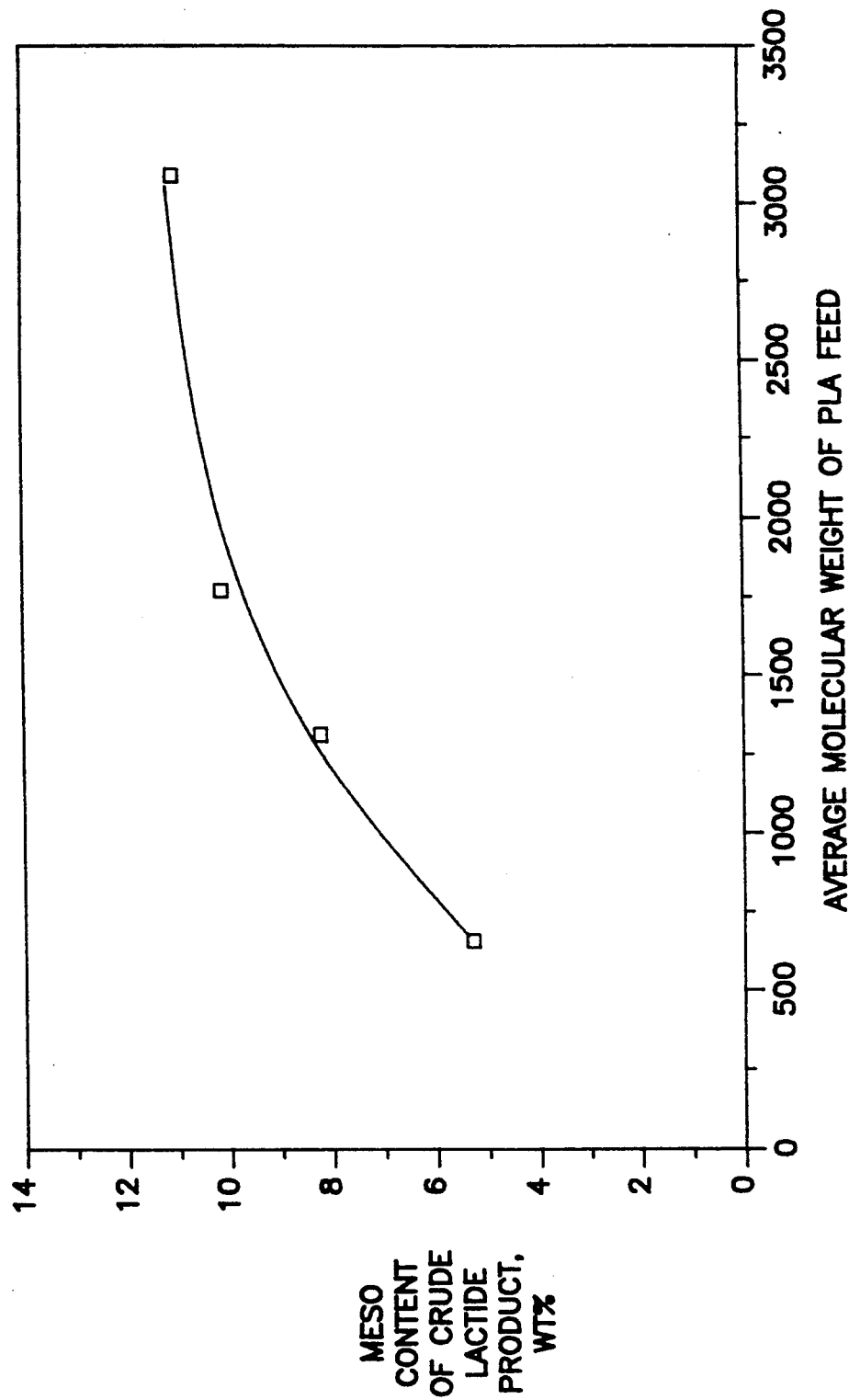
FIG. 4 is a graph which represents the relationship between the optical purity of generated lactide in relation to the molecular weight of the feed to the lactide reactor.

Lactide was generated from several samples of PLA (also known as polylactic acid or prepolymer) each sample having a different average molecular weight. The conditions under which the lactide was generated in each experiment include: 10 mm Hg pressure, 0.05 wt. % SnO as catalyst (same catalyst as Example 1), run to approximately 73% conversion of PLA to lactide, constant heat input and stirring speed. The reaction temperature was allowed to float, reaching the value necessary to dissipate the heat input. This method of running tends to give a constant lactide production rate, within limits. Five samples of PLA were used, a reference case with molecular weight of 640 g/mol (determined by end group titration) and four additional cases obtained by further heating of the PLA under vacuum at 200°-220° C. The results of the experiments are tabulated below and shown in FIG. 4.

| Feed Avg. Molecular Weight | Add. Heat (hr.) | PLA Temp (°C.) | Reac. Temp (°C.) | Lactide Rate (hr.$^{-1}$) | % Meso | % Lactic acid |
|---|---|---|---|---|---|---|
| 640 | 0 | 200 | 234 | 0.73 | 5.3 | 5.3 |
| 1140 | 1 | 200–210 | 225 | 0.89 | 6.8 | 2.9 |
| 1350 | 1.5 | 210–220 | 233 | 0.76 | 8.1 | 2.5 |
| 1800 | 3.8 | 200–215 | 252 | 0.76 | 10.1 | 2.3 |
| 3100 | 6.5 | 200–210 | 257 | 0.78 | 11.2 | 1.7 |

Increasing the feed molecular weight results in a very clear decrease in the concentration of lactic acid in the crude lactide. This is a processing benefit because it will be easier to achieve polymerization grade lactide from a cleaner starting material. However, as the table and figure show, the concentration of meso-lactide in the crude lactide increases significantly. The optimal operation will require careful balancing of these two factors based on the desired final polymer product. In particular, if lactide of high optical purity is desired then the process should be run with a low molecular weight feed.

EXAMPLE 3

The Effect of Catalyst Concentration on Optical Purity

Figure 5:
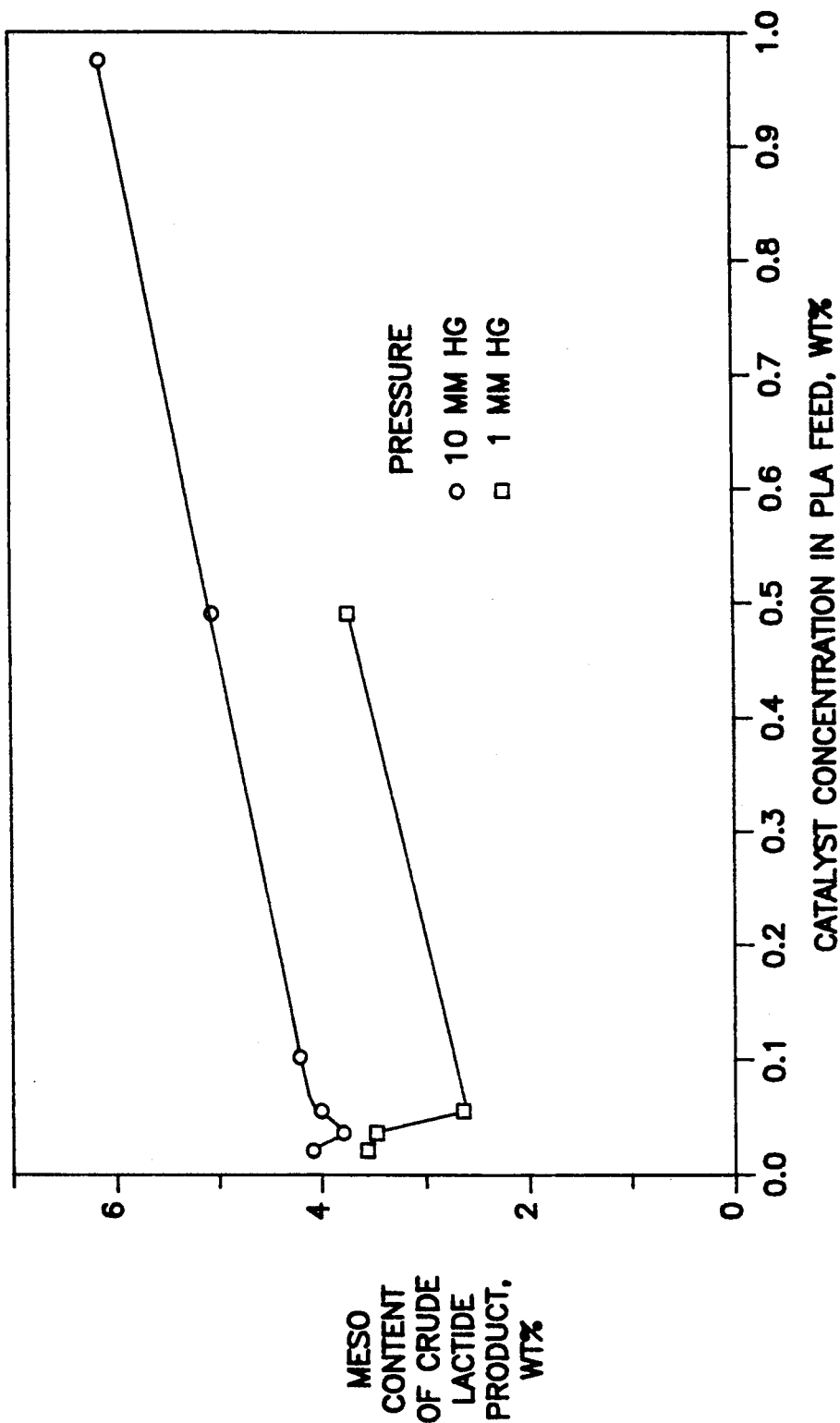
FIG. 5 is a graph showing the relationship between catalyst concentration and optical purity of the resulting lactide.

Lactide was produced using SnO catalyst (catalyst of Example 1) from PLA with a molecular weight of 650 g/mol at several catalyst levels and two pressures. The power input was held constant (Variac setting of 75) and the reaction temperature was allowed to seek an equilibrium level. The percentage meso in the crude lactide for each experiment is shown in the table below and graphically in FIG. 5.

| PRESSURE (mm Hg) | Catalyst conc. wt % | Meso. wt % | Temp (°C.) |
|---|---|---|---|
| 1 | 0.010 | 3.5 | 245 |
| 1 | 0.025 | 3.4 | 230 |
| 1 | 0.030 | 2.6 | 213 |
| 1 | 0.500 | 3.8 | 200 |
| 10 | 0.010 | 4.1 | 231 |
| 10 | 0.025 | 3.8 | 220 |
| 10 | 0.050 | 4.0 | 210 |
| 10 | 0.100 | 4.3 | 210 |
| 10 | 0.500 | 5.1 | 197 |
| 10 | 1.000 | 6.3 | 195 |

It is clear from this data that catalyst levels above 0.1 wt. % lead to an increase in the content of meso-lactide, for both pressures studied. The increase occurs even though the overall lactide generation rate increases and the reaction temperature decreases. The content of meso-lactide also increases at very low concentrations of catalyst, resulting in a minimum for 0.02–0.10 wt. % SnO. In a preferred embodiment, catalyst concentrations may be varied depending on desired final polymer physical properties.

EXAMPLE 4

The Effect of Recycling Lactide Reactor Bottoms

Example 1 demonstrated that some form of purge of the liquid in the reactor (reactor bottoms) would probably be necessary for a continuous operation. This example demonstrates a surprising benefit if such purge stream is recycled back to the catalyst addition stage.

PLA was produced from the same lactic acid used in Example 1, utilizing the same method. This was used to generate lactide at 1 mm Hg with 0.05 wt. % SnO as catalyst (catalyst of Example 1). The reaction was run to 72% conversion, at which point the lactide production rate had begun to decline significantly. The heat was turned off and the flask was cooled to 150° C. under a nitrogen atmosphere 390 gms of 88% L-lactic acid was added to the 80 gms of residue. The flask was adapted to generate a new batch of PLA, simulating the recycle of reactor bottoms to the evaporator section. The new PLA was heated under vacuum until the molecular weight was about 650 g/mol (by end group titration). A GPC (gel permeation chromatography) analysis showed that the reactor bottoms had been completely broken down and been reabsorbed into the PLA, with no sign of high molecular weight reactor bottoms. The lactide generation was rerun using the same conditions as before, and it was surprisingly found that the lactide production rate increased: from 0.86 hr$^{-1}$ for the first run (prior to recycle) to 1.03 hr$^{-1}$ for the second run (recycle, no additional catalyst). The reaction temperature was 213° C. for the first run and 215° C. for the second run. The composition of the crude lactide and of the reactor bottoms were similar for the two cases. Thus, in a preferred embodiment the reactor bottoms is recycled to a point prior to the lactide reactor to increase overall yield from the lactic acid feed.

EXAMPLE 5

Polymerization Technique

The lactide is a mixture of 80% L- and 20% D,L-lactide, recrystallized to high purity. 40 gm of lactide is charged to a flask with magnetic stirring. A THF (Tetrahydrofuran, Burdick and Jackson, high purity, non-spectro) solution containing L-lactic acid, water, or both is added to the lactide. The flask is lowered into an oil bath at 140°–160° C. to melt and mix the monomer. This is held for five minutes after complete melting (about 15 minutes total). A starting sample is pulled for GC and/or water analysis. A catalyst solution of 10 wt. % tin(II) 2-ethylhexanoate (Johnson Mathey Electronics, Tech. Grade) in toluene is added and allowed to react for 1 minute. Five gram samples are then pipetted into silanized and nitrogen flushed 20 ml vials. These are quickly placed into a temperature controlled oil bath. Vials are pulled and frozen at various time intervals up to 4 hours.

The samples are prepared for analysis by breaking the polymer out of the vials and dissolving in THF at room temperature on an orbital shaker (about 1–6 hours for 5 grams of polymer in 125 mls THF). The mixture is then diluted to 1% in THF and analyzed utilizing GPC analysis to determine the molecular weight and percent conversion.

EXAMPLE 6

Figure 6:
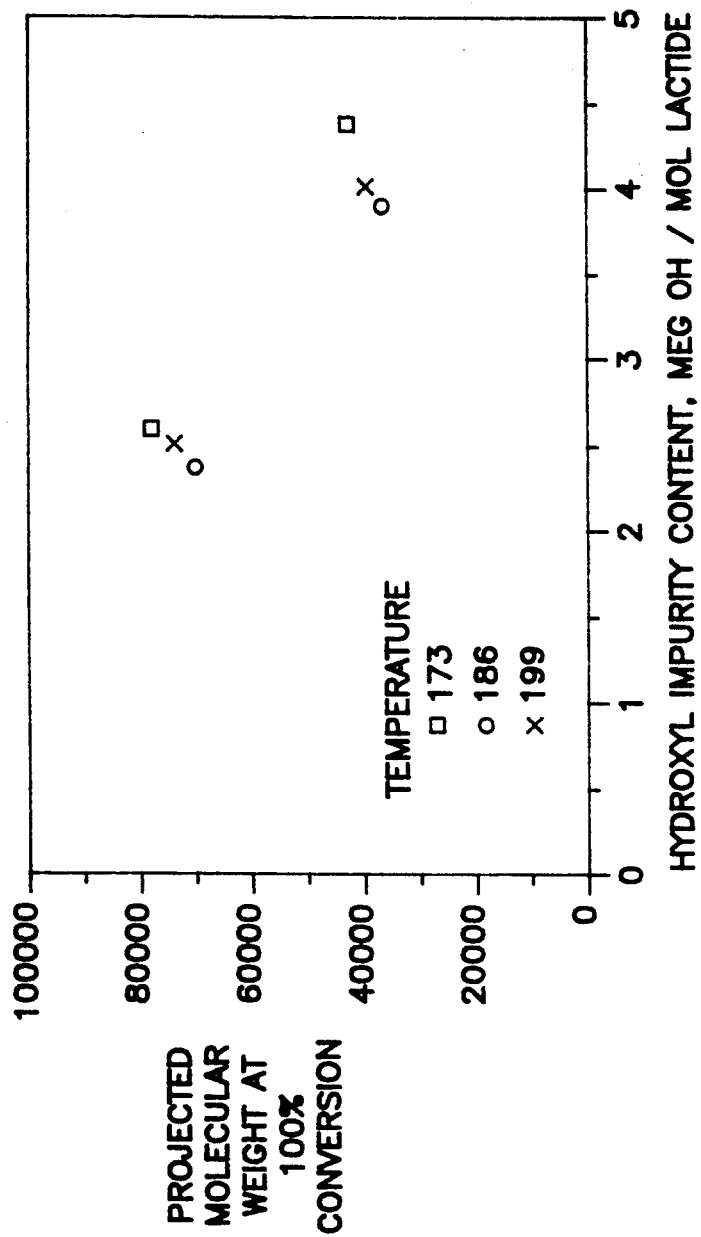
FIG. 6 is a graph showing the effect of hydroxyl impurities on polymer molecular weight at different temperatures.

Polymer Molecular Weight is Controlled by Impurity Level and is Independent of Temperature Experiments were conducted at three different temperatures with two levels of impurities, using the polymerization technique of Example 5. In each case, a projected molecular weight which the polymer would achieve at 100% conversion was determined by GPC analysis of the highest conversion sample and corrected for the unconverted monomer. This method has been shown to give reproducible values and accurately corrects for any effect of sampling at different conversion levels. The results of the experiments are tabulated below and shown graphically in FIG. 6.

| Temperature (°C.) | Hydroxyl impurities meq/mol | Molecular weight, adjusted to 100% conv. |
|---|---|---|
| 173 | 4.45 | 40,100 |
| 173 | 2.52 | 77,500 |
| 186 | 3.90 | 37,800 |
| 186 | 2.38 | 72,100 |
| 199 | 3.98 | 39,400 |
| 199 | 2.48 | 74,900 |

A statistical analysis of variance showed that the molecular weight of the polymer was controlled solely by the level of impurities, with temperature having no effect. Thus, in a preferred embodiment hydroxyl impurities are controlled to desired levels to control the physical properties of the resulting polymer product.

EXAMPLE 7

Figure 7:
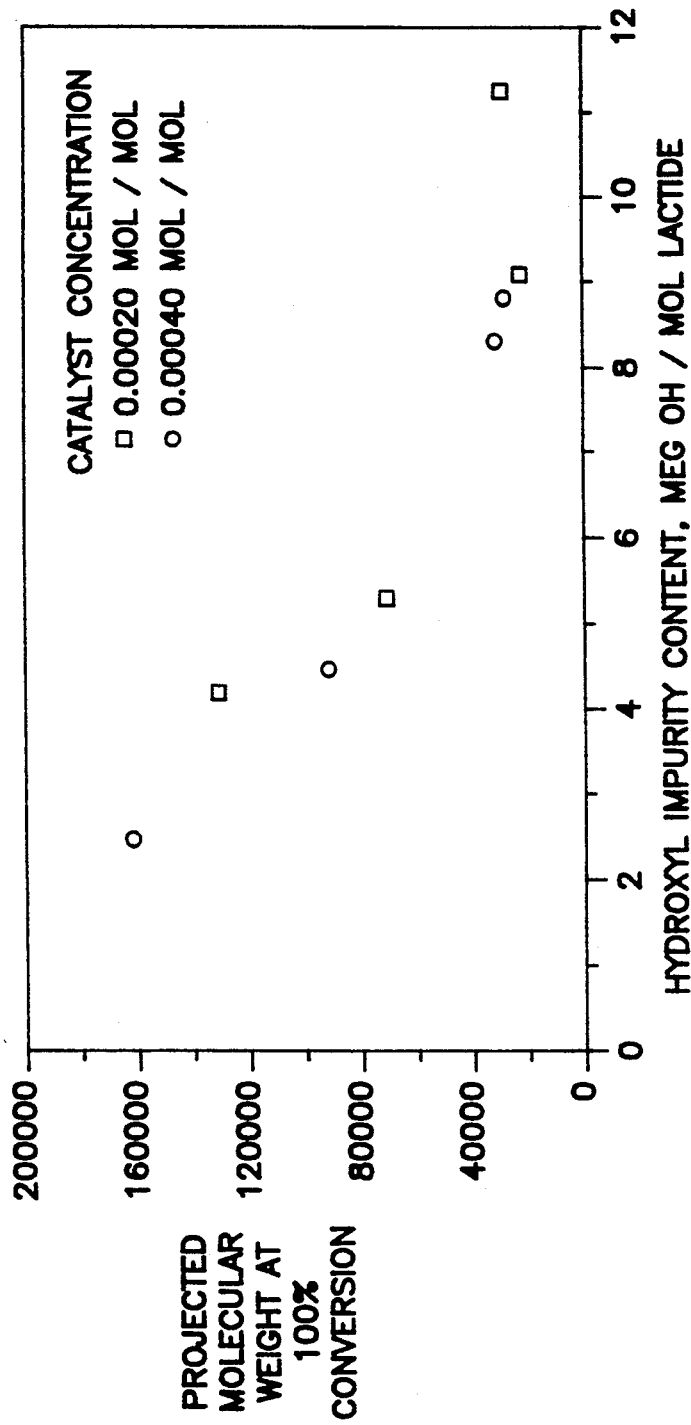
FIG. 7 is a graph showing the effect of hydroxyl impurities on polymer molecular weight at different catalyst concentrations.

Polymer Molecular Weight is Controlled by Impurity Level and is Nearly Independent of Catalyst Concentration The polymers were prepared at 160° C. using the polymerization technique of Example 5. Two levels of water (H=5.9-8.8 meq./mol., L=1.8-3.7 meq./mol.) and two levels of lactic acid (H=0.9-1.3 meq./mol., L=0.1-0.2 meq./mol.) were used in a duplicated factorial design experiment at each of two different levels of catalyst (0.0002 mol/mol; and 0.0004 mol/mol) (eight experiments total). Projected molecular weights were calculated as in Example 6. The results are shown in tabular form below and graphically in FIG. 7.

| Water conc. | Impurity level Lactic acid | Total Hydroxyl Content meq/mol | Molecular weight adjusted to 100% conversion | Catalyst Level |
|---|---|---|---|---|
| L | L | 4.49 | 133,500 | 0.002 |
| H | H | 11.35 | 33,900 | 0.002 |
| L | H | 5.36 | 74,500 | 0.002 |
| H | L | 9.20 | 29,400 | 0.002 |
| L | H | 4.65 | 89,800 | 0.004 |
| H | H | 8.31 | 34,900 | 0.004 |
| L | L | 2.52 | 160,600 | 0.004 |
| H | L | 8.89 | 32,700 | 0.004 |

An analysis of variance revealed that the change in hydroxyl content accounted for 91% of the variance in the molecular weight, while the change in catalyst concentration accounted for only 4% of the variance. Both effects were found to be statistically significant.

These data show, in a preferred embodiment, the critical need to control the level of hydroxyl containing impurities in the lactide in order to control the molecular weight of the final polymer.

EXAMPLE 8

Equilibrium Concentration of Lactide in Polylactic-Acid

Figure 8:
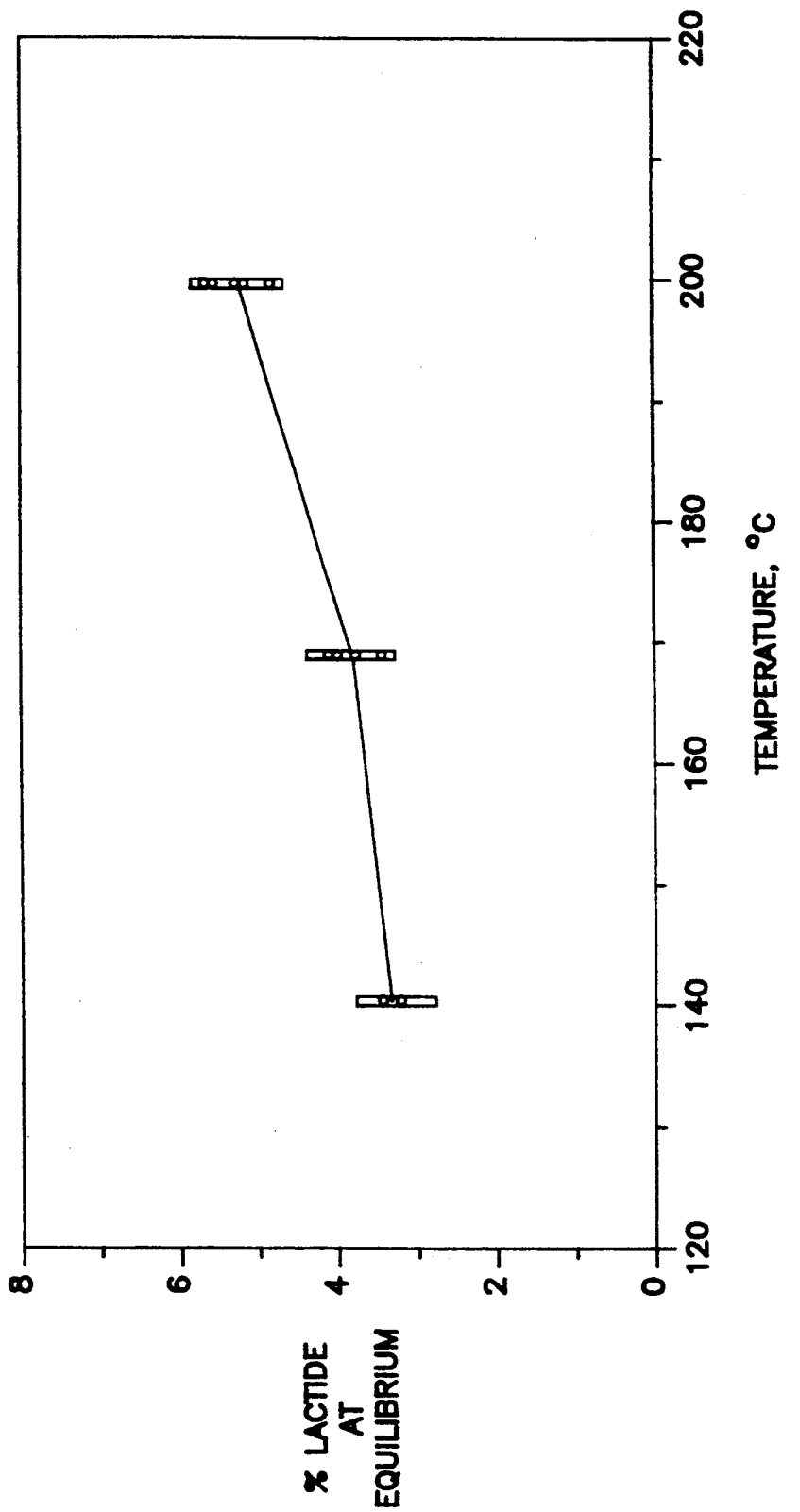
FIG. 8 is a graph showing the equilibrium lactide concentration as a function of temperature.

PLA of 650 MW was heated at atmospheric pressure with either 0.00, 0.05, or 0.15 wt. % SnO as a catalyst (Catalyst of Example 1). The mixtures were held at three different desired temperature for 20 minutes, at which time 10 wt. % of purified L-lactide was added to the mixture with stirring. The vessel was fitted with a condenser to prevent the loss of water or other volatile components. Samples were removed from the reaction vessel at times ranging from 5 minutes to 450 minutes and were analyzed using an Ultrastyragel ® 100A GPC column (Waters Chromatography, a division of Millipore Corp.) with THF as the mobile phase to determine the concentration of lactide. The concentration data were fit to a simple first order decay model using a non-linear regression software package (SAS Institute, Inc.) to determine the equilibrium values. The resulting projected values for the equilibrium concentrations of lactide are shown in the table below and plotted graphically in FIG. 8. The results show the beneficial effect of rapid removal of lactide from the lactide reactor in preferred embodiments to further drive the lactide generation reaction.

| Temperature (°C.) | Catalyst conc., wt % | Equilibrium lactide, wt % |
|---|---|---|
| 140 | 0.05 | 3.50 |
| 140 | 0.15 | 3.30 |
| 170 | 0.05 | 4.00 |
| 170 | 0.05 | 3.57 |
| 170 | 0.15 | 4.13 |
| 170 | 0.15 | 3.85 |
| 200 | 0.00 | 5.12 |
| 200 | 0.05 | 5.38 |
| 200 | 0.05 | 4.82 |
| 200 | 0.15 | 5.47 |
| 200 | 0.15 | 5.20 |

EXAMPLE 9

Relative Rates of Racemization

Samples of PLA (with and without SnO (catalyst of Example 1) as catalyst) and lactide were heated and stirred for four hours at 200° C. at atmospheric pressure in a round bottom flask fitted with a condenser to prevent loss of volatile components. The samples were then allowed to cool and the optical purity of the PLA was determined by saponification followed by a measurement of the optical rotation. The lactide sample was analyzed by GC to determine the meso-lactide content, which was then converted to a measurement of optical purity.

| Sample | Optical Composition | |
|---|---|---|
| | % L | % D |
| Initial PLA | 96.0 | 4.0 |
| PLA, no catalyst | 95.4 | 4.6 |
| PLA, 0.05 wt % SnO | 87.5 | 12.5 |
| PLA, 0.15 wt % SnO | 90.0 | 10.0 |
| Initial lactide | 99.7 | 0.3 |
| Lactide after heating | 97.2 | 2.8 |

The results of this experiment demonstrate that racemization occurs fastest in PLA which is exposed to catalyst. Thus, in the most preferred embodiment racemization is controlled in the lactide generating reactor. It is however recognized that another area of racemization control will be the evaporators which are used to prepare PLA, because of the long residence times and the possible inclusion of catalyst and catalyzing impurities. In a preferred embodiment the residence time of the lactide in the distillation column will be kept low, minimizing the potential for racemization.

EXAMPLE 10

Effect of Mass Transfer Efficiency on Lactide Composition

Lactide was produced from PLA at several catalyst levels and at two pressures to determine the effect of mass transfer. The catalyst was SnO (catalyst of Example 1) with constant heat input at a power setting on the Variac of 75%.

The table below shows the effect of changing mass transfer efficiency by adjusting the pressure (vapor phase lactide concentration). Note that the reaction temperatures were similar for each pair of cases.

| Catalyst conc., wt % SnO | 1 mm Hg | | | 10 mm Hg | | |
|---|---|---|---|---|---|---|
| | T (°C.) | meso, wt % | net rate (hr$^{-1}$) | T (°C.) | meso, wt % | net rate (hr$^{-1}$) |
| 0.05 | 213 | 2.6 | 0.79 | 210 | 4.0 | 0.46 |
| 0.50 | 200 | 3.8 | 0.83 | 197 | 5.1 | 0.52 |

The increased mass transfer efficiency at 1 mm Hg vs 10 mm Hg results in significantly higher net lactide production rates and a lower concentration of meso-lactide. In a preferred embodiment the lactide reactor is operated under vacuum to facilitate mass transfer.

EXAMPLE 11

The Effects of Metal Contaminants Concentrating In the Lactide Reactor

Lactic acid was concentrated and polymerized to form low molecular weight polylactic acid (MW range of about 600-2200) and fed to a continuous pilot scale reactor for the production of lactide. At the end of 1-week of operation a sample of the reactor liquid was taken and analyzed for metals. The results are shown below.

| | |
|---|---|
| Iron | 1200 ppm |
| Chromium | 310 ppm |
| Nickel | 180 ppm |
| Sodium | 89 ppm |
| Calcium | 55 ppm |
| Manganese | 26 ppm |
| Magnesium | 13 ppm |
| Copper | 6 ppm |
| Potassium | ND |

The metals profile clearly shows corrosion of the stainless steel reaction system, either in the formation of the prepolymer or in the lactide generating reactor.

The high metals content, which represents the build-up over a week with no purge on the reactor bottoms, is detrimental to the lactide formation process. The data below demonstrate this effect.

Three lactide runs were made following the usual laboratory process. A control using 650 MW PLA, the control with added iron and chromium (1000 ppm iron from FeCl$_3$*6H$_2$O, 1000 ppm iron from FeSO$_4$*7H$_2$O, and 1000 ppm chromium from CrCl$_3$*6H$_2$O), and the reactor bottoms sample (initial MW 2000). Fresh catalyst, 0.05 wt. % SnO (Catalyst of Example 1), was added to each sample and lactide was generated at 10 mm Hg with a reactor temperature of 230°-240° C.

| Sample | Yield | Rate (hr$^{-1}$) | MW$_n$ | MW$_w$ |
|---|---|---|---|---|
| Control PLA | 73% | 0.73 | 3100 | 13300 |
| Control PLA + metals | 63% | 0.90 | 9900 | 126400 |
| Reactor sample | 42% | 0.42 | 6400 | 143400 |

The runs with elevated metals content had lower yield and much higher weight average molecular weight at the end of the reaction, demonstrating the detrimental effects of a high metal content.

It is believed that in a preferred embodiment, a purge of the reactor bottoms will alleviate this problem.

EXAMPLE 12

The Effect of Acidic Impurities on Distillation

Lactide was produced in a continuous pilot plant at rates of 2-5 kg/hr. The starting materials were Purac lactic acid of about 85% concentration. A PLA prepolymer having a range of molecular weights from about 400-2000 MW was made batchwise by heating first at atmospheric pressure and then under vacuum. The prepolymer was used to supply the continuous feed to the lactide reactor. The reactor was run at a temperature of 220°-240° C. and pressure of about 35 mm Hg.

Two samples of lactide were distilled in a 2000 ml three-neck flask with mechanical stirring. The lactide was taken overhead through a 2 cm ID by 30 cm glass column with stainless steel packing. Reflux was not controlled, but the column was insulated. The rate of distillation ranged from about 150-370 gms/hr. After taking approximately 80% overhead, the bottoms were analyzed by GC to determine the concentration of oligomers and to calculate the amount of polymerization (based on feed) which had occurred. The table below shows the relationship between the concentration of acidic impurities in the crude lactide and the extent of polymerization during distillation. The data show the effect of acidic impurities on final polymer molecular due to the increased oligomer content in the purified lactide.

| Sample | Acidic Impurity meq [COOH]/ mol lactide | Percent of Charge taken overhead | Oligomer Increase as % of feed |
|---|---|---|---|
| #1 | 19 | 92% | 0.5% |
| #2 | 43 | 80% | 7.6% |

EXAMPLE 13

The Beneficial Effects of Catalyst Activation on Lactide Generation Rates

Three grades of PLA were evaluated for the production of lactide using various catalysts. The sources of the PLA were: A) Purac heat stable grade lactic acid, B) a test sample of lactic acid from Lactech, Inc. which was produced by fermentation, and A/B) a 50/50 mix of the PLA produced from each of the previous two sources.

Lactide was generated in a laboratory apparatus (three-neck flask with mechanical stirring, primary condenser operated at 85°-100° C., and receiving flasks and traps) at constant temperature of 230° C. and constant pressure of 10 mm Hg. Initial PLA charge was 360 gms of material having an average molecular weight of about 650. The catalyst charge was 0.045 wt. % as Sn for each type of catalyst.

The table shows the results of several experiments for different combinations.

| PLA | Catalyst | Crude lactide yield, wt % | Overall rate (gm/gm hr PLA) |
|---|---|---|---|
| A | none | 42 | 0.20 |
| A | SnO | 68 | 0.70 |
| A/B | SnO | 50 | 0.30 |
| A | SnCl$_2$ | 78 | 1.90 |
| B | SnCl$_2$ | 76 | 1.30 |
| A | Sn Octonoate | 74 | 1.90 |
| B | Sn Octonoate | 75 | 1.50 |

From the table above it can be readily seen that PLA B is not as reactive toward lactide production as is PLA A. The effect is particularly pronounced with SnO catalyst.

Analysis of the initial lactic acids did not reveal any significant impurities in B relative to A. It is believed that some unidentified contaminant in PLA B blocks catalyst activity.

Further experiments were performed using the liquid contents of the lactide reactor (reactor bottoms or bottoms) from previous runs with SnO catalyst as the catalyst. The overall Sn content was maintained at 0.045 wt. %.

| PLA | Catalyst/ Bottoms | Crude lactide yield, wt % | Overall rate (gm/gm hr PLA) |
|---|---|---|---|
| A | SnO/(A/B) | 46 | 0.31 |
| A | SnO/A | 65 | 1.20 |
| B | SnO/A | 71 | 1.17 |
| B | SnO/A | 70 | 1.22 (replicate) |

The table above clearly shows that lactide can be produced from PLA B as fast as from PLA A if the SnO catalyst is pretreated by first producing a batch of lactide from PLA A. The table also shows that if the catalyst is pretreated by producing a batch of lactide from the blend A/B PLA then it is rendered ineffective and does not promote lactide production at high rates even from PLA A. Thus, applicants have surprisingly found that apparent deficiencies in the lactic acid source can be overcome by proper conditioning of the catalyst.

Comparison of the rates for PLA A with SnO (0.70 hr$^{-1}$ table 1) and SnO/A (1.20 hr$^{-1}$ table 2) shows that the conditioning also increases the overall rate of the reaction for the most productive lactic acid, providing an additional benefit.

Applicants believe that heating the catalyst at about 200°-230° C. for about 10-30 minutes in the presence of either 1) PLA made from a purified lactic acid, 2) PLA prepared by the partial hydrolysis of purified lactide, 3) purified lactic acid, or 4) lactide, would provide similar benefits as the method described above.

EXAMPLE 14

Distillation of Crude Lactide

The overhead fraction from example 12 was collected in three receivers, containing 14%, 36%, and 28% of the crude lactide charge, respectively. The first fraction contained over 5 wt. % lactic acid and was discarded. Fractions 2 and 3 were combined and redistilled, yielding a lactide fraction with total acidic impurities of 4.4 milliequivalents/mol of lactide. This fraction was polymerized using the polymerization technique of example 5 (temperature 180° C., catalyst/monomer ratio 1:5000), yielding a polymer with number average molecular weight of 42,100 at 100% conversion and weight average molecular weight of 76,300. Actual conversion was 84.6% at 2 hours.

Applicants have also completed experiments and experimental development to show the overall feasibility and advantages of the disclosed process for production of polylactide beginning with an ester of lactic acid as the feed material. Although, as outlined above, there are many similarities between a polylactide process utilizing lactic acid as a feed source and such process utilizing an ester of lactic acid as the feed material, variations in operating conditions and equipment arrangement along with catalyst usage have been discovered. The following examples, Examples 15-27, document experimental work done by applicants in the area of producing polylactide from an ester of lactic acid. Examples 15-18 demonstrate that various catalysts are effective for completing the condensation reaction from an ester of lactic acid to a polylactide prepolymer. Examples 19-21 demonstrate some purification of reaction products along with polymerization of the lactide. Examples 22 and 23 give additional data on the course of a reaction and indicate that the distributions observed probably correspond to equilibrium. Example 24 demonstrates probable control of polymer molecular weight when utilizing a lactate ester by controlling impurities as was previously shown above when utilizing lactic acid and accompanying impurities. Examples 25-27 demonstrate the use of heterogenous or solid, supported catalysts for the production of lactide from an ester of lactic acid.

Unless otherwise indicated, the following experimental materials and test procedures were utilized in Examples 15-27:

Methyl lactate, ethyl lactate, and butyl lactate were supplied by PURAC America, Inc. under the tradename PURASOLV and used without further purification.

Gas chromatography analysis (GC) for lactate ester oligomers was performed using a Hewlett Packard model 5890 with a DB-17 (J & W Scientific) column. The injector port temperature was 200° C. The column temperature started at 40° C. and was ramped to 250° C. at 10° C./min, then held for 10 minutes. Flame ionization detection (FID) was used. Except where noted, the results of GC analysis to determine composition are based on area percent, uncorrected for percent recovery or relative response factors.

Gel Permeation Chromatography was performed using a Waters Chromatography system with Ultrastyragel ® columns Chloroform (B & J high purity) was used as a solvent. Calibration used polystyrene standards supplied by TSK.

EXAMPLE 15

Catalyzed and Non-Catalyzed Condensation Reactions with Lactic Acid and Ethyl Lactate 2.65 kilograms of lactic acid (heat-stable grade), supplied by PURAC, was heated at atmospheric pressure under a nitrogen atmosphere to a temperature of 180° C. No catalyst was added. 600 grams of overhead, greater than 99% water, was removed during this phase. The material was allowed to cool. Heating was resumed with the flask at a pressure of 50 mm Hg. A slight boil was maintained as the material was heated to 180° C., removing another 135 grams of material. The lactic acid content of the second overhead is estimated to be about 2%, with the remaining material being water. Total heating time for the atmospheric phase was 5.5 hours, and for the vacuum phase was 3.5 hours. The material was a light tan color. Titration of the acid group content showed the material to have an average number average molecular weight of 650 g/mol, corresponding to 9 repeat units. Several samples made following the same procedure were tested and shown to have a lactide concentration of less than 5 weight percent.

250 grams of methyl lactate were heated at atmospheric pressure under a nitrogen atmosphere to a temperature of 145° C. The material boiled at 145° C. No catalyst was added. No condensate was generated during 3 hours of heating and the pot material maintained boiling at 145° C. The pot material was colorless and contained 99% methyl lactate and 1% DP2. No reaction was apparent.

225 grams of ethyl lactate were heated with 3.5% tin(II) ethylhexanoate catalyst at atmospheric pressure under a nitrogen atmosphere to a temperature of 145° C., for 3 hours. The material initially boiled at 140° C., due to the ethanol present. The overhead consisted primarily of ethyl lactate and the expected condensation byproduct ethanol. The pot material was slightly green and contained 46.2% ethyl lactate, 32.3% DP2, 13.3% DP3, 4.1% DP4 and 1.0% D- and/or L-lactide.

EXAMPLE 16

Condensation of Ethyl Lactate with P-toluene Sulfonic Acid Catalyst 250 grams of ethyl lactate were heated with 0.5% p-toluene sulfonic acid catalyst at atmospheric pressure under a nitrogen atmosphere to a temperature of 145° C., for 3 hours. The material initially boiled at 140° C. The overhead consisted primarily of ethyl lactate and the expected condensation byproduct ethanol. The pot material was colorless and contained 45% ethyl lactate, undetermined oligomers, and 2.0% D- and/or L-lactide.

EXAMPLE 17

Condensation of Ethyl Lactate with Fascat ® 9102 Catalyst 220 grams of ethyl lactate were heated with 5.0% Fascat ® 9102 (Atochem North America, Inc.) catalyst at atmospheric pressure under a nitrogen atmosphere to a temperature of 145° C., for 3 hours. The material initially boiled at 140° C. The overhead consisted primarily of ethyl lactate and the expected condensation byproduct ethanol. Total weight of distillate was 24 gms, consisting of 98% ethanol. The pot material was light yellow color and contained 45% ethyl lactate, 29% DP2, 12% DP3, 3% DP4, 0.4% meso-lactide and 2.6% D- and/or L-lactide, based on response factors for pure lactide and ester. Response factors for the oligomers were assumed to be equal to the response factor for the ester. This assumption was used in all subsequent examples wherein corrections for response factors are used.

EXAMPLE 18

Condensation of Butyl Lactate with Fascat ® 9102 Catalyst 260 grams of butyl lactate were heated with 5.0% Fascat ® 9102 (Atochem North America, Inc.) catalyst at atmospheric pressure under a nitrogen atmosphere to a temperature of 190° C., for 2.5 hours. The material initially boiled at 165° C. The overhead consisted primarily of butyl lactate and the expected condensation byproduct butanol. Total weight of distillate was 43.5 gms, consisting of 94% butanol. The pot material was deep orange color and contained 45% butyl lactate, undetermined oligomers, and 2.0% D- and/or L-lactide, based on response factors for pure lactide and ester. A white precipitate was observed.

EXAMPLE 19

Condensation of Methyl Lactate with Fascat ® 9100 Catalyst 277 grams of methyl lactate were heated with 0.8% Fascat ® 9100 (Atochem North America, Inc., Philadelphia, Pa.) catalyst at atmospheric pressure under a nitrogen atmosphere to a temperature of 165° C., for 4.0 hours. The material initially boiled at 125° C. The overhead consisted primarily of methyl lactate and the expected condensation byproduct methanol. Total weight of distillate was 44 gms, consisting of 72% methanol. The material was slightly green and contained 30.8% methyl lactate, 36.5% DP2, 18.9% DP3, 2.6% DP4 and 8.6% D- and/or L-lactide. Corrected for response factors as detailed above, this corresponds to 25% methyl lactate, 30%. DP2, 15% DP3, 2% DP4, and 6% meso- and D- and/or L-lactide.

EXAMPLE 20

Lactide Generated from Methyl Lactate in the Presence of Fascat ® 9102 Catalyst 240 grams of ethyl lactate were heated with 5.0% Fascat ® 9102 (Atochem North America, Inc.) catalyst at atmospheric pressure under a nitrogen atmosphere to a initially boiled at 140° C. The overhead consisted primarily of ethyl lactate and the expected condensation byproduct ethanol. Total weight of distillate was 44 gms, consisting of 98% ethanol. The material was allowed to cool. Heating was resumed with the flask at a pressure of 50 mm Hg. A slight boil was maintained as the material was heated to 170° C., removing another 22 grams of material. The ethyl lactate content of the second overhead is estimated to be about 52%, with the remaining material being ethanol. Total heating time for the vacuum phase was 7.0 hours. The material was a dark orange color.

EXAMPLE 21

Distillation of Lactide Generated from Methyl Lactate in the Presence of Fascat ® 9100 Catalyst 2.2 kilograms of methyl lactate were heated with 0.6% Fascat ® 9100 (Atochem North America, Inc.) catalyst at atmospheric pressure under a nitrogen atmosphere to a temperature of 165° C., for 5.0 hours. The material initially boiled at 125° C. The overhead consisted primarily of methyl lactate and the expected condensation byproduct methanol. Total weight of distillate was 350 gms, consisting of 91% methanol. The material was allowed to cool. Heating was resumed with the flask at a pressure of 50 mm Hg. A slight boil was maintained as the material was heated to 145° C., removing another 165 grams of material. The methyl lactate content of the second overhead is estimated to be about 83%, with the remaining material being methanol. Total heating time for the vacuum phase was 6.8 hours.

The material was heated to 200° C. and the pressure reduced to 10 mm Hg. The distillate was partially condensed to form a product fraction and the remaining vapors were further condensed to form an overhead fraction.

Overhead: 67.3% methyl lactate, 16.2% DP2, 1.0% DP3 and 11.7% D- and/or L-lactide. Response factor corrected concentrations were 64% methyl lactate, 15% DP2, 1% DP3 and 10% D- and/or L-lactide.

Product: 3.1% methyl lactate, 6.9% DP2, 1.8% DP3, 0.2% DP4, and 77.6% D- and/or L-lactide and 9.3% meso-lactide. Response value corrected concentrations were 3% methyl lactate, 7% DP2, 2% DP3, 76% D- and/or L-lactide and 9% meso-lactide.

Purification of product material by distillation in a packed column at 10 mm Hg and 150° C. resulted in a fraction containing 0.2% DP2, 8.8% meso and 90.3% D- and/or L-lactide. The purified lactide was polymerized with tin(II) ethylhexanoate (Aldrich Chemicals) at 3000:1 molar ratio and 185° C. for 1.5 hours. Polymerized lactide resulted in a weight and number average molecular weight (Mw and Mn) of 121,500 and 55,000 respectively and a 97.5% lactide conversion.

EXAMPLE 22

Course of Reaction and Equilibrium Data

Samples from the reaction mixture for Example 20 were taken at various stages of the reaction and analyzed by GC. The results are shown in the table below. A steady increase in the lactide concentration as the reaction progresses was noted. The reaction mixture appears to maintain an equilibrium distribution, as evidenced by the constancy of the ratios:

$$\frac{DP4 \cdot DP2}{DP3 \cdot DP3}, \quad \frac{EL \cdot DP3}{DP2 \cdot DP2}$$

which represent equilibrium constants for the reactions:

$$DP_3 + DP_3 \rightleftharpoons DP_4 + DP_2$$

$$DP_2 + DP_2 \rightleftharpoons EL + DP_3$$

In Table 1 below, a summary is provided of the analytical results obtained from the above-stated samples.

TABLE 1

| Sample | Time (min.) | ml over | Overhead comp. % EtOH | Composition of Reaction Mixture GC Area % | | | | | | $DP_4.DP_2$ $DP_3.DP_3$ | $EL.DP_3$ $DP_3.DP_2$ | $LAC.El$ $DP_3$ | $LAC.DP_2$ $DP_4$ |
|---|---|---|---|---|---|---|---|---|---|---|---|---|---|
| | | | | EL | DP2 | Lac | DP3 | DP4 | Meso | | | | |
| 1 | 45 | 7 | 93 | 56.18 | 28.25 | 0.89 | 8.16 | 1.00 | 0.04 | 0.42 | 0.57 | 6.13 | 25.14 |
| 2 | 140 | 32.5 | 100 | 43.39 | 30.89 | 2.69 | 13.54 | 3.00 | 0.05 | 0.51 | 0.62 | 8.62 | 27.70 |
| 3 | 157 | 42.5 | 100 | 33.86 | 29.97 | 5.81 | 17.05 | 5.28 | 0.09 | 0.54 | 0.64 | 11.54 | 32.98 |
| 4 | 190 | 51 | 100 | 26.62 | 27.54 | 9.83 | 18.67 | 7.28 | 0.19 | 0.58 | 0.66 | 14.02 | 37.19 |
| 5 | 215 | 56.5 | 100 | 20.28 | 24.91 | 14.89 | 19.66 | 8.93 | 0.45 | 0.58 | 0.64 | 15.36 | 41.54 |
| 6 | 355 | 62.5 | 42 | 16.11 | 22.32 | 18.51 | 19.12 | 9.87 | 0.95 | 0.60 | 0.62 | 15.60 | 41.86 |
| 7 | 500 | 69 | 54 | 5.86 | 11.49 | 43.70 | 13.89 | 9.30 | 2.48 | 0.55 | 0.62 | 18.44 | 53.99 |

EXAMPLE 23

Methyl-lactate/Lactide Ring-Opening Experiments

A series of ring-opening experiments were done in order to determine whether the distributions observed during condensation were equilibrium distributions. Mixtures of methyl lactate and lactide were prepared in weight ratios of 70/30, 51/49, and 36/64. Catalyst (1% by weight, Fascat ® 9102) was added and the sealed vials were placed in an oil bath at 143° C. Samples were pulled at times from ½ hour to 24 hours. Table 2 below compares these results to the intermediate reaction samples taken during the reaction of Example 21. Note that the condensation reaction samples from Example 21 give relatively constant equilibrium ratios for the later samples. Also note that the ring-opening experiments yielded equilibrium ratios (time 4 hours or 24 hours) which agree with each other (independent of initial mixture composition) and with the condensation reactions.

| Sample | Initial Wt. % ML/LTD | Time | Composition of Reaction Mixture GC Area % | | | | | $DP_4.DP_2$ $DP_3.DP_3$ | $ML.DP_3$ $DP_2.DP_2$ | $LAC.ML$ $DP_3$ | $LAC.DP_2$ $DP_4$ |
|---|---|---|---|---|---|---|---|---|---|---|---|
| | | | ML | DP2 | Lac | DP3 | DP4 | | | | |
| 1 | 70/30 | 0.5 hr. | 48.99 | 23.21 | 2.38 | 21.85 | 0.5 | 0.02 | 1.99 | 5.34 | 110.48 |
| 2 | | 1 hr. | 45.31 | 31.31 | 1.79 | 18.62 | 1.35 | 0.12 | 0.86 | 4.36 | 41.51 |
| 3 | | 2 hr. | 42.22 | 35.23 | 2.11 | 17.1 | 2.2 | 0.27 | 0.58 | 5.21 | 33.79 |
| 5 | | 24 hr. | 32.34 | 34.21 | 4.43 | 20.58 | 5.27 | 0.43 | 0.57 | 6.96 | 28.76 |
| 1 | 51/49 | 0.5 hr. | 29.69 | 22.29 | 7.68 | 35.85 | 2 | 0.03 | 2.14 | 6.36 | 85.59 |
| 2 | | 1 hr. | 26.02 | 29.71 | 8.66 | 29.28 | 4.52 | 0.16 | 0.86 | 7.70 | 56.92 |
| 3 | | 2 hr. | 25.3 | 32.75 | 8.99 | 24.97 | 5.78 | 0.30 | 0.59 | 9.11 | 50.94 |
| 5 | | 24 hr. | 17.61 | 25.94 | 22.55 | 21.85 | 7.9 | 0.43 | 0.57 | 18.17 | 74.04 |
| 1 | 36/64 | 0.5 hr. | 13.74 | 14.5 | 26.88 | 37.16 | 4.31 | 0.05 | 2.43 | 9.94 | 90.43 |
| 2 | | 1 hr. | 13.44 | 19.56 | 29.96 | 27.84 | 6.09 | 0.15 | 0.98 | 14.46 | 96.23 |
| 3 | | 2 hr. | 12.86 | 21.61 | 32.75 | 23.25 | 7.65 | 0.31 | 0.64 | 18.11 | 92.51 |
| 4 | | 4 hr. | 14.45 | 23.66 | 27.29 | 22.03 | 8.38 | 0.41 | 0.57 | 17.90 | 77.05 |
| Methyl-lactate Condensation Experiments | | | | | | | | | | | |
| 1 | | | 79.4 | 19.2 | 0.3 | 0.3 | | | | | |
| 2 | | | 57.52 | 34.5 | 0.7 | 6.4 | 0.05 | 0.04 | 0.31 | 6.29 | 483.00 |
| 3 | | | 42.68 | 38.8 | 2.3 | 14.4 | 0.9 | 0.17 | 0.41 | 6.82 | 99.16 |
| 4 | | | 30.8 | 36.5 | 8.6 | 18.9 | 2.6 | 0.27 | 0.44 | 14.01 | 120.73 |
| 5 | | | 28.1 | 33.2 | 8 | 24.2 | 7.4 | 0.42 | 0.62 | 9.29 | 35.89 |

| Sample | Initial Wt. % ML/LTD | Time | Composition of Reaction Mixture GC Area % | | | | | $\frac{DP_4.DP_2}{DP_3.DP_3}$ | $\frac{ML.DP_3}{DP_2.DP_2}$ | $\frac{LAC.ML}{DP_3}$ | $\frac{LAC.DP_2}{DP_4}$ |
|---|---|---|---|---|---|---|---|---|---|---|---|
| | | | ML | DP2 | Lac | DP3 | DP4 | | | | |
| 6 | | | 15.9 | 27.2 | 14 | 29.7 | 10.3 | 0.32 | 0.64 | 7.49 | 36.97 |

EXAMPLE 24

Molecular Weight Control of Polylactide Produced From an Ester of Lactic Acid Feed Source Purified lactide (100% L-lactide, supplied by Boehringer Ingelheim KG) was polymerized in a glass vial at 185° C. for 2 hours and 3000:1 monomer:catalyst molar ratio of tin(II) ethylhexanoate catalyst (Aldrich Chemicals), achieving over 90% conversion to polymer with a number average molecular weight of 116,000. The experiment was repeated with addition of either lactic acid or ethyl lactate as a molecular weight control agent. The results are tabulated below.

| | Source of Control Agent | |
|---|---|---|
| Weight % Control Agent | Ethyl Lactate | Lactic Acid |
| | Polymer Molecular Weight | |
| 0.15 | 83,900 | 57,300 |
| 0.30 | 52,600 | 40,200 |
| 0.50 | 32,600 | 24,800 |
| 1.00 | 19,600 | 13,800 |

The polymers formed with ethyl lactate as the control agent had a molecular weight which averaged 37% higher than the polymers formed with lactic acid as the control agent. This implies that purification requirements to meet a specified molecular weight may be slightly lower for a process based on lactate esters rather than on lactic acid feed, if autogenous impurities are used as the molecular weight control agent.

EXAMPLE 25

Solid, Supported Catalytic Reactions 325 grams of methyl lactate were heated with 3.0 wt. % Amberlyst ® 15 resin (Rohm and Haas) catalyst at 80 mm Hg, under a nitrogen atmosphere, to a temperature of 104° C., for 6 hours. The material boiled at 78° C. The overhead consisted primarily of methanol with some methyl lactate. Total volume of distillate—43 ml at 87% methanol. The material was allowed to cool. Heating was resumed with the flask at a pressure of 45 mm Hg. A slight boil was maintained as the material was heated to 120° C., removing another 63.5 mL of material. The methyl lactate content of the second overhead is estimated to be about 62%, with the remaining material being methanol. Total heating time for this phase was 5.5 hours. The material was a dark orange color.

EXAMPLE 26

2.5 kilograms of methyl lactate were heated with 3.5 wt. % Amberlyst ® 36 resin (Rohm and Haas) catalyst at 80 mm Hg, under a nitrogen atmosphere, to a temperature of 104° C., for 10.75 hours. The material initially boiled at 70° C. The overhead consisted primarily of methanol with some methyl lactate, total volume of distillate—505 ml at 81% methanol. The material was allowed to cool, and the catalyst exchanged with fresh Amberlyst ® 36 resin at 4.5 wt. %. Heating was resumed with the flask at a pressure of 40 mm Hg. A slight boil was maintained as the material was heated to 115° C., removing another 275 ml of material. The methyl lactate content of the second overhead is estimated to be about 40%, with the remaining material being methanol. Total heating time for this phase was 11.25 hours. The material was allowed to cool, and the catalyst exchanged with fresh Amberlyst ® 36 resin at 5.5 wt. %. Heating was resumed with the flask at a pressure of 25 mm Hg. A slight boil was maintained as the material was heated to 115° C., removing another 120 ml of material. The methyl lactate content of the third overhead is estimated to be about 50%, with the remaining material being methanol. Total heating time for this phase was 6 hours. The material was a dark orange color.

The composition of the pot was monitored as a function of time, with the results shown below. These concentrations are calculated upon correction for response factors as detailed above.

| | Initial Charge: 2500 Grams Methyl Lactate | | | | | |
|---|---|---|---|---|---|---|
| Time (hrs) | Methanol (ml) | Methyl lactate | DP2 | DP3 | DP4 | L-lactide |
| — | 80 | 90.5 | 7.4 | 0.3 | — | 0.1 |
| 6.5 | 264 | 54.2 | 38.5 | 8.6 | 0.5 | 0.9 |
| 9.2 | 411 | 27.4 | 40.2 | 22.7 | 3.5 | 1.9 |
| 13.5 | 485 | 18.6 | 34.0 | 27.0 | 5.5 | 2.0 |
| 15.2 | 511 | 15.3 | 29.4 | 27.3 | 6.5 | 2.1 |
| 20.2 | 574 | 7.3 | 15.5 | 23.0 | 8.5 | 4.8 |
| 20.7 | 584 | 6.4 | 14.2 | 19.0 | 6.8 | 4.3 |
| 27.0 | 656 | 3.2 | 8.2 | 14.0 | 7.6 | |

The results are very similar to those obtained using homogeneous catalysts.

EXAMPLE 27

Ring-Opening Reactions in the Presence of a Solid, Supported Catalyst

A ring-opening reaction was performed using the heterogenous catalyst, Amberlyst ® 36. The conditions are similar to those of Example 23, which used a homogenous catalyst.

Temperature was 140° C., catalyst charge was 2.33% by weight, capped vials with samples taken at 40, 70 and 190 minutes.

| Initial Compositions: | | | | |
|---|---|---|---|---|
| Set | #1 | #2 | #3 | #4 |
| Methyl lactate | 70 | 51 | 36 | 15 |
| lactide | 30 | 49 | 64 | 85 |

Gas was evolved and a pressure build-up was noticed, so no samples were heated for longer than 3 hours.

| GC's Sample | Methyl lactate | DP2 | DP3 | DP4 |
|---|---|---|---|---|
| Set #1 (ML 70/LTD 30) | | | | |

-continued

| GC's Sample | Methyl lactate | DP2 | DP3 | DP4 |
|---|---|---|---|---|
| 40 | 54.4 | 20.9 | 6.8 | 0.4 |
| 70 | 46.2 | 31.7 | 10.1 | 0.7 |
| 90 | 37.8 | 34.6 | 13.2 | 1.2 |
| Set #2 (ML 51/LTD 49) | | | | |
| 40 | 38.6 | 15.5 | 10.1 | 0.8 |
| 70 | 31.3 | 27.3 | 16.2 | 1.5 |
| 190 | 24.9 | 32.9 | 18.2 | 2.2 |
| Set #3 (ML 36/LTD 64) | | | | |
| 40 | 25.7 | 9.7 | 11.4 | 0.9 |
| 70 | 19.3 | 17.0 | 18.7 | 1.8 |
| 190 | 13.7 | 26.2 | 22.5 | 3.5 |
| Set #4 (ML 15/LTD 85) | | | | |
| 40 | 10.5 | 1.8 | 4.9 | 0.2 |
| 70 | 7.2 | 2.4 | 8.1 | 0.4 |
| 190 | 2.2 | 4.1 | 10.7 | 1.1 |

Applicants note that the reaction rates are somewhat slower than those of Example 23, but that the final compositions are similar. This data supports the hypothesis that equilibrium distributions are being generated.

Applicants believe this final example, coupled with previous examples demonstrates the overall feasibility and advantages of the disclosed process.

It will be understood, however, that even though these numerous characteristics and advantages of the invention have been set forth in the foregoing description, together with details of the structure and function of the invention, the disclosure is illustrative only, and changes may be made in detail, especially in matters of shape, size and arrangement of the parts or in the sequence or the timing of the steps, within the broad principle of the present invention to the full extent indicated by the broad general meaning of the terms in which the appended claims are expressed.

What is claimed is:

1. A process for the continuous conversion of an ester of lactic acid to a substantially purified lactide, said process comprising the steps of:
   a) providing a source of the ester of lactic acid;
   b) forming crude lactide in the presence of catalyst means for catalyzing the condensation of molecules of the ester of lactic acid to form molecules of polylactic acid, wherein the ester of lactic acid is first condensed in the presence of said catalyst means to form a condensation reaction by-product and polylactic acid molecules having an average molecular weight of between about 100 to about 5,000, and the polylactic acid molecules are at least partially depolymerized in the presence of catalyst means for catalyzing the depolymerization of the polylactic acid molecules to form lactide molecules; and
   c) purifying the crude lactide formed in step (b) to form a substantially purified lactide by distilling the crude lactide.

2. The process of claim 1, wherein the source of the ester of lactic acid of step (a) is a single ester or a mixture of esters of the general formula:

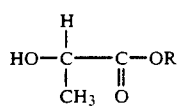

wherein R is a $C_1-C_8$ linear or branched alkyl.

3. The process of claim 2, wherein the source of the ester of lactic acid of step (a) includes a single ester or a mixture of said esters plus lactic acid.

4. The process of claim 2, wherein the ester of lactic acid is selected from the group consisting of methyl lactate, ethyl lactate, propyl lactate, butyl lactate, isopropyl lactate and isobutyl lactate.

5. The process of claim 1, wherein the source of the ester of lactic acid for step (a) contains impurities, which may include but are not limited to, color bodies, carbohydrates, proteins, amino acids, salts, metal ions, alcohols, aldehydes, ketones, carboxylic acids, esters of carboxylic acids or mixtures thereof.

6. The process of claim 2, wherein the ester of lactic acid is in solution in a hydroxylic medium, said ester of lactic acid comprising about 20% by weight to about 100% by weight of the solution.

7. The process of claim 6, wherein said hydroxylic medium is evaporated prior to forming said crude lactide.

8. The process of claim 1, wherein the forming of crude lactide in the presence of catalyst means of step (b) comprises:
   (a) providing a catalyst bed reactor system containing a solid supported catalyst means for catalyzing the condensation of molecules of the ester of lactic acid to form polylactic acid molecules; and
   (b) feeding the ester of lactic acid through said solid supported catalyst means to form said polylactic acid molecules.

9. The process of claim 8, wherein the solid supported catalyst means comprises a granular catalyst support and catalyst with acid or Lewis acid functionality.

10. The process of claim 8, wherein the polylactic acid molecules are at least partially depolymerized within the catalyst bed reactor system to form crude lactide wherein the catalyst means for catalyzing the condensation of the molecules of ester of lactic acid to form molecules of polylactic acid also is the catalyst means for catalyzing the depolymerization of the polylactic acid molecules to form said lactide molecules.

11. The process of claim 1, wherein the forming of the crude lactide in step (b) is in the presence of a homogenous soluble catalyst for catalyzing the condensation of molecules of the ester of lactic acid to form molecules of polylactic acid.

12. The process of claim 11, wherein the crude lactide is fed to a flash distillation system to remove said homogeneous soluble catalyst.

13. The process of claim 1, wherein the purifying of the crude lactide of step (c) comprises fractionating by distillation of the crude lactide to form three component streams comprising an overhead low boiling stream, a high boiling bottoms stream, and an intermediate boiling sidedraw stream.

14. The process of claim 13, wherein the high boiling bottoms stream is recycled to form a crude lactide in the presence of catalyst means for catalyzing the depolymerization of the polylactic acid molecules to form lactide molecules.

15. The process of claim 13, wherein the overhead low boiling stream contains water, solvent, lactic acid, lactide, esters of lactic acid, dimer or combinations thereof.

16. The process of claim 13, wherein the intermediate boiling sidedraw stream comprises substantially purified lactide of purity greater than or equal to about 99% by weight lactide.

17. The process of claim 13, wherein the intermediate boiling sidedraw stream is further distilled in a subsequent distillation process.

18. The process of claim 1, wherein the crude lactide formed in step (b) is vaporized to form a lactide vapor, said lactide vapor being contained within a single enclosed space comprising a reactor and top-mounted distillation column wherein the purifying of the crude lactide in step (c) is completed prior to removal of the substantially purified lactide as an intermediate boiling sidedraw stream.

19. The process of claim 1, wherein racemization of the polylactic acid is controlled in a range of 0%-100% by altering residence times in process equipment, impurity levels, catalyst levels, catalyst types, temperatures and pressures.

20. The process of claim 1, wherein the crude lactide formed is a vapor being subsequently partially condensed to remove volatile contaminants to form a condensed, partially purified liquid lactide, the condensed partially purified lactide then being purified as in step (c).

21. A process for the continuous conversion of an ester of lactic acid to polylactide, said process comprising the steps of:
a) providing a source of the ester of lactic acid;
b) forming crude lactide in the presence of catalyst means for catalyzing the condensation of molecules of the ester of lactic acid to form molecules of polylactic acid, wherein the ester of lactide is first condensed in the presence of said catalyst means to form a condensation reaction by-product and polylactic acid molecules having an average molecular weight of between about 100 and about 5,000, and the polylactic acid molecules are at least partially depolymerized in the presence of said catalyst means for catalyzing the depolymerization of polylactic acid molecules to form lactide molecules;
c) purifying the crude lactide formed in step (b) to form a substantially purified lactide by distilling the crude lactide; and
d) reacting the substantially purified lactide of step (c) to form a polylactide.

22. The process of claim 21, wherein the source of the ester of lactic acid of step (a) is a single ester or a mixture of esters of the general formula:

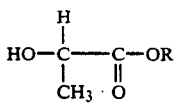

wherein R is a $C_1$-$C_8$ linear or branched alkyl.

23. The process of claim 22, wherein the source of the ester of lactic acid of step (a) includes a single ester, or a mixture of said esters, plus lactic acid.

24. The process of claim 22, wherein the ester of lactic acid is selected from the group consisting of methyl lactate, ethyl lactate, propyl lactate, butyl lactate, isopropyl lactate and isobutyl lactate.

25. The process of claim 21, wherein the source of the ester of lactic acid for step (a) contains impurities, which may include but are not limited to, color bodies, carbohydrates, proteins, amino acids, salts, metal ions, alcohols, aldehydes, ketones, carboxylic acids, esters of carboxylic acids or mixtures thereof.

26. The process of claim 22, wherein the ester of lactic acid is in solution in a hydroxylic medium, said ester of lactic acid comprising from about 20% by weight to about 100% by weight of the solution.

27. The process of claim 26, wherein said hydroxylic medium is evaporated prior to forming said crude lactide.

28. The process of claim 21, wherein the forming of crude lactide in the presence of catalyst means of step (b) comprises:
(a) providing a catalyst bed reactor system containing a solid supported catalyst means for catalyzing the condensation of molecules of the ester of lactic acid to form polylactic acid molecules; and
(b) feeding the ester of lactic acid through said solid supported catalyst means to form said polylactic acid molecules.

29. The process of claim 28, wherein the solid supported catalyst means comprises a granular catalyst support and catalyst with acid or Lewis acid functionality.

30. The process of claim 28, wherein the polylactic acid molecules are at least partially depolymerized within the catalyst bed reactor system to form crude lactide wherein the catalyst means for catalyzing the condensation of the molecules of ester of lactic acid to form molecules of polylactic acid also is the catalyst means for catalyzing the depolymerization of the polylactic acid molecules to form said lactide molecules.

31. The process of claim 21, wherein the forming of the crude lactide in step (b) is in the presence of a homogenous soluble catalyst for catalyzing the condensation of molecules of the ester of lactic acid to form molecules of polylactic acid.

32. The process of claim 31, wherein the crude lactide is fed to a flash distillation system to remove said homogeneous-soluble catalyst.

33. The process of claim 21, wherein the purifying of the crude lactide by distillation of step comprises fractionating the crude lactide to form three component streams comprising an overhead low boiling stream, a high boiling bottoms stream, and an intermediate boiling sidedraw stream.

34. The process of claim 33, wherein the high boiling bottoms stream is recycled to form a crude lactide in the presence of catalyst means for catalyzing the depolymerization of the polylactic acid molecules to form lactide molecules.

35. The process of claim 33, wherein the overhead low boiling stream contains water, solvent, lactic acid, lactide, ester of lactic acid, dimer or combinations thereof.

36. The process of claim 33, wherein the intermediate boiling sidedraw stream comprises substantially purified lactide of purity greater than or equal to about 99% by weight lactide.

37. The process of claim 33, wherein the intermediate boiling sidedraw stream is further distilled in a subsequent distillation process.

38. The process of claim 21, wherein the crude lactide formed in step (b) is vaporized to form a lactide vapor, said lactide vapor being contained within a single enclosed space comprising a reactor and top-mounted distillation column wherein the purifying of the crude lactide in step (c) is completed prior to removal of the substantially purified lactide as an intermediate boiling sidedraw stream.

39. The process of claim 21, wherein racemization of the polylactic acid is controlled in a range of 0%-100% by altering residence times in process equipment, impurity levels, catalyst levels, catalyst types, temperatures and pressures.

40. The process of claim 21, wherein the crude lactide formed is a vapor being subsequently partially condensed to remove volatile contaminants to form a condensed, partially purified liquid lactide, the condensed partially purified lactide then being purified as in step (c).

41. A process for the continuous conversion of an ester of lactic acid to a substantially purified lactide, said process comprising the steps of:
   a) providing a source of the ester of lactic acid;
   b) forming a condensation reaction by-product and polylactic acid molecules having an average molecular weight of between about 100 and about 5000 by condensing the ester of lactic acid provided in step (a) so as to polymerize lactic acid derived from the ester of lactic acid;
   c) forming a crude lactide from the polylactic acid molecules in the presence of catalyst means wherein evaporation of the crude lactide facilitates further polymerization of lactic acid and generation of crude lactide; and
   d) purifying the crude lactide formed in step (c) to form a substantially purified lactide by distilling the crude lactide;

42. The process of claim 41, wherein the ester of lactic acid of step (a) is a single ester or a mixture of esters of the general formula:

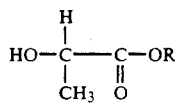

wherein R is a $C_1$–$C_8$ linear or branched alkyl.

43. The process of claim 42, wherein the ester of lactic acid of step (a) includes a single ester or a mixture of said esters plus lactic acid.

44. The process of claim 42, wherein the ester of lactic acid is in solution in a hydroxylic medium, said ester of lactic acid ranging in concentration from about 20% by weight to about 100% by weight of said solution.

45. The process of claim 44, wherein said hydroxylic medium is evaporated prior to forming said crude lactide.

46. The process of claim 41, wherein the forming of polylactic acid molecules of step (b) comprises:
   (a) providing a catalyst bed reactor system containing a solid supported catalyst means for catalyzing the condensation of molecules of the ester of lactic acid to form polylactic acid;
   (b) feeding the ester of lactic acid through said catalyst bed reactor system to form said polylactic acid molecules.

47. The process of claim 46, wherein the solid supported catalyst means comprises a granular catalyst support and catalyst with acid or Lewis acid functionality.

48. The process of claim 46, wherein the polylactic acid molecules are at least partially depolymerized within the catalyst bed reactor system to form crude lactide wherein the catalyst means for catalyzing the condensation of the molecules of ester of lactic acid to form molecules of polylactic acid also is the catalyst means for catalyzing the depolymerization of the polylactic acid molecules to form said lactide molecules.

49. The process of claim 41, wherein the forming of polylactic acid molecules in step (b) is in the presence of a homogeneous soluble catalyst for catalyzing the condensation of molecules of the ester of lactic acid to form molecules of polylactic acid.

50. The process of claim 49, wherein the crude lactide of step (c) is fed to a flash distillation system to remove said soluble homogeneous catalyst.

51. The process of claim 41, wherein the purifying of the crude lactide by distillation in step (d) comprises fractionating the crude lactide to form three component streams comprising, an overhead low boiling stream, a high boiling bottoms stream, and an intermediate boiling sidedraw stream.

52. The process of claim 51, wherein the high boiling bottoms stream is recycled to form a crude lactide in the presence of catalyst means for catalyzing the depolymerization of the polylactic acid molecules to form lactide molecules as in step (b).

53. The process of claim 51, wherein the overhead low boiling stream comprises water, solvent, lactic acid, lactide, ester of lactic acid, dimer or combinations thereof.

54. The process of claim 51, wherein the intermediate boiling sidedraw stream comprises substantially purified lactide of purity greater than or equal to about 99% by weight lactide.

55. The process of claim 51, wherein the intermediate boiling sidedraw stream is further distilled in a subsequent distillation process.

56. The process of claim 41, wherein the crude lactide formed in step (c) is vaporized to form a lactide vapor, said lactide vapor being contained within a single enclosed space comprising a reactor and top-mounted distillation column wherein the purifying of the crude lactide in step (d) is completed prior to removal of the substantially purified lactide as an intermediate boiling sidedraw stream.

57. A process for the continuous conversion of an ester of lactic acid to a substantially purified lactide, said process comprising the steps of:
   a) providing a source of ester of lactic acid of the general formula:

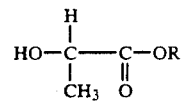

wherein R is a $C_1$–$C_8$ linear or branched alkyl;
   b) forming crude lactide in the presence of a catalyst, wherein said catalyst contains acid or Lewis acid functionality, wherein the ester of lactic acid is first condensed in the presence of said catalyst to form a condensation reaction by-product and polylactic acid molecules with said polylactic acid molecules at least partially depolymerized in the presence of said catalyst to form lactide molecules; and,
   c) purifying the crude lactide formed in step (b) to form a substantially purified lactide by distilling the crude lactide, wherein distilling the crude lactide comprises fractionating the crude lactide into at least three component streams, an overhead low-boiling stream, a high-boiling bottom stream, and an intermediate boiling sidedraw stream.

58. A process for the continuous conversion of an ester of lactic acid to polylactide, said process comprising the steps of:

a) providing a source of the ester of lactic acid;

b) forming a condensation reaction by-product and polylactic acid in the presence of first catalyst means for catalyzing the condensation of molecules of the ester of lactic acid to form polylactic acid, wherein the molecules of polylactic acid have an average molecular weight of between about 100 and about 5,000;

c) forming a crude lactide from the polylactic acid molecules in the presence of second catalyst means for catalyzing the depolymerization of polylactic acid to form the crude lactide;

d) purifying the crude lactide formed in step (c) to form a substantially purified lactide by distilling the crude lactide; and e) reacting the substantially purified lactide of step (d) to form a polylactide.

* * * * *

UNITED STATES PATENT AND TRADEMARK OFFICE
CERTIFICATE OF CORRECTION

PATENT NO. : 5,247,059
DATED : September 21, 1993
INVENTOR(S) : Gruber et al.

It is certified that error appears in the above-indentified patent and that said Letters Patent is hereby corrected as shown below:

On the Title page; item [75]:

In the list of Inventors, the address "Long Lake" should be replaced with --Maple Plain--.

In the identification of the Assignee, the address "Minneapolis" should be replaced with --Minnetonka--.

Column 7, line 5, replace "Applicant's" with --Applicants'--.

Column 8, line 24, replace "byproducts" with --by-products--.

Column 10, line 66, after "Preparation" insert --"--.

Column 11, line 5, after "Blends" insert --"--.

Column 11, line 15, after "Copolymers" insert --"--.

Column 14, line 19, replace "on" with --in--.

UNITED STATES PATENT AND TRADEMARK OFFICE
CERTIFICATE OF CORRECTION

PATENT NO. : 5,247,059
DATED : September 21, 1993
INVENTOR(S) : Gruber et al.

It is certified that error appears in the above-indentified patent and that said Letters Patent is hereby corrected as shown below:

Column 18, line 55, after "Tetraphenyltin," insert --"--.

Signed and Sealed this

Second Day of May, 1995

Attest:

BRUCE LEHMAN

Attesting Officer

Commissioner of Patents and Trademarks